US012435032B2

(12) United States Patent
Le et al.

(10) Patent No.: US 12,435,032 B2
(45) Date of Patent: Oct. 7, 2025

(54) L-γ-METHYLENEGLUTAMINE COMPOUNDS AND METHODS OF USE

(71) Applicant: University of Mississippi, University, MS (US)

(72) Inventors: Hoang Van Le, Oxford, MS (US); Md. Imran Hossain, Vernon Hills, IL (US)

(73) Assignee: University of Mississippi, University, MS (US)

( * ) Notice: Subject to any disclaimer, the term of this patent is extended or adjusted under 35 U.S.C. 154(b) by 941 days.

(21) Appl. No.: 17/597,550

(22) PCT Filed: Jul. 13, 2020

(86) PCT No.: PCT/US2020/041839
§ 371 (c)(1),
(2) Date: Jan. 11, 2022

(87) PCT Pub. No.: WO2021/011492
PCT Pub. Date: Jan. 21, 2021

(65) Prior Publication Data
US 2022/0267255 A1    Aug. 25, 2022

Related U.S. Application Data

(60) Provisional application No. 62/873,586, filed on Jul. 12, 2019.

(51) Int. Cl.
*C07C 237/20* (2006.01)
*A61P 35/00* (2006.01)

(52) U.S. Cl.
CPC ............ *C07C 237/20* (2013.01); *A61P 35/00* (2018.01)

(58) Field of Classification Search
None
See application file for complete search history.

(56) References Cited

U.S. PATENT DOCUMENTS

2014/0227191 A1    8/2014   Dinkelborg et al.
2017/0283387 A1    10/2017  Manning et al.

OTHER PUBLICATIONS

Kazmaier et. al (Angew. Chem. Int. Ed. 2007, 46, 4570-4573) (Year: 2007).*
Newsholme, P.; Procopio, J.; Lima, M. M. R.; Pithan-Curi, T. C.; Curi, R. Glutamine and Glutamate? Their Central Role in Cell Metabolism and Function. Cell Biochem. Funct. 2003, 21 (1), 1-9.
Akins, N. S.; Nielson, T. C.; Le, H. V. Inhibition of Glycolysis and Glutaminolysis: An Emerging Drug Discovery Approach to Combat Cancer. Curr. Top. Med. Chem. 2018, 18 (6), 494-504.
Erickson, J. W.; Cerione, R. A. Glutaminase: A Hot Spot for Regulation of Cancer Cell Metabolism? Oncotarget 2010, 1 (8), 734-740.
Xiang, Y.; Stine, Z. E.; Xia, J.; Lu, Y.; O'Connor, R. S.; Altman, B. J.; Hsieh, A. L.; Gouw, A. M.; Thomas, A.G.; Gao, P.; Sun, L.; Song, L.; Yan, B.; Slusher, B. S.; Zhuo, J.; Ooi, L. L.; Lee, C. G. L.; Mancuso, A.; McCallion, A. S.; Le, A.; Milone, M. C.; Rayport, S.; Felsher, D. W.; Dang, C. V. Targeted Inhibition of Tumor-Specific Glutaminase Diminishes Cell-Autonomous Tumorigenesis. J. Clin. Invest. 2015, 125 (6), 2293-2306.
Hensley, C. T.; Wasti, A. T.; DeBerardinis, R. J. Glutamine and Cancer: Cell Biology, Physiology, and Clinical Opportunities. J. Clin. Invest. 2013, 123 (9), 3678-3684.
Shapiro, R. A.; Clark, V. M.; Curthoys, N. P. Inactivation of Rat Renal Phosphate-Dependent Glutaminase with 6-Diazo-5-Oxo-L-Norleucine. Evidence for Interaction at the Glutamine Binding Site. J. Biol. Chem. 1979, 254 (8), 2835-2838.
Thangavelu, K.; Pan, C. Q., Karlberg, T.; Balaji, G.; Uttamchandani, M.; Suresh, V.; Schiller, H.; Low, B. C.; Sivaraman, J. Structural Basis for the Allosteric Inhibitory Mechanism of Human Kidney-Type Glutaminase (KGA) and Its Regulation by Raf-Mek-Erk Signaling in Cancer Cell Metabolism. Proc. Natl. Acad. Sci. U.S. A. 2012, 109 (20), 7705-7710.
Thangavelu, K.; Chong, Q. Y.; Low, B. C.; Sivaraman, J. Structural Basis for the Active Site Inhibition Mechanism of Human Kidney-Type Glutaminase (KGA). Sci. Rep. 2014, 4, 3827.
Barclay, R. K.; Phillipps, M.A. Effects of 6-Diazo-5-Oxol-Norleucine and Other Tumor Inhibitors on the Biosynthesis of Nicotinamide Adenine Dinucleotide in Mice. Cancer Res. 1966, 26 (2), 282-286.
Hofer, A.; Steverding, D.; Chabes, A.; Brun, R.; Thelander, L. Trypanosoma Brucei CTP Synthetase: A Target for the Treatment of African Sleeping Sickness. Proc. Natl. Acad. Sci. U. S. A. 2001, 98 (11), 6412-6416.
Grayzel, A. I.; Seegmiller, J.E.; Love, E. Suppression of Uric Acid Synthesis in the Gouty Human by the Use of 6-Diazo-5-Oxo-L-Norleucine. J. Clin. Invest. 1960, 39 (3), 447-454.
Done, J.; Fowden, L. A New Amino Acid Amide in the Groundnut Plant (*Arachis hypogaea*) ; Evidence of the Occurrence of Gamma-Methyleneglutamine and Gamma-Methyleneglutamic Acid. Biochem. J. 1952, 51 (4), 451-458.
Wailes, P.; Whiting, M. C.; Fowden, L. Synthesis of γ-Methyleneglutamic Acid and γ-Methyleneglutamine. Nature 1954, 174 (4420), 130-131.
Blake, J.; Fowden, L. Gamma-Methyleneglutamic Acid and Related Compounds from Plants. Biochem. J. 1964, 92 (1), 136-142.
Zacharius, R. M.; Pollard, J. K.; Steward, F. C. 7-Methyleneglutamine and 7-Methyleneglutamic Acid in the Tulip (*Tulipa gesneriana*). 1954.

(Continued)

*Primary Examiner* — John S Kenyon
*Assistant Examiner* — Rehana Ismail
(74) *Attorney, Agent, or Firm* — Thomas | Horstemeyer, LLP

(57) ABSTRACT

Disclosed are substantially pure L-γ-methyleneglutamine, L-γ-methyleneglutamic acid, and/or amide derivatives, and methods of use thereof. In particular, the presently disclosed subject matter relates to L-γ-methyleneglutamine, L-γ-methyleneglutamic acid, and/or amide derivatives thereof, and methods of treating cancer. The method comprises administering one or more substantially pure L-γ-methyleneglutamine, L-γ-methyleneglutamic acid, and/or amide derivatives to a subject in need thereof.

15 Claims, 15 Drawing Sheets

(56) References Cited

OTHER PUBLICATIONS

Harris, G.; Tatchell, A. R. Amino Acids and Peptides of Hops and Wort III. The Amino Acids of Fresh Hops. J. Inst. Brew. 1953, 59 (5), 371-377.

Tschiersch, B. Uber y-Methylenglutamin Und y-Methylenglutaminsiiure in Keimlingen von *Amorpha fruticosa* L. Phytochemistry 1962, 1 (2), 103-105.

Fowden, L. The Nitrogen Metabolism of Groundnut Plants: The Role of y-Methyleneglutamine and y-Methyleneglutamic Acid. Ann. Bot. 1954, 18 (4), 417-440.

Powell, G. K.; Dekker, E. E. A Modified, High Yield Procedure for the Synthesis of Unlabeled and 14C-Labeled 4-Methylene-DL-Glutamic Acid. Prep. Biochem. Biotechnol. 1981, 11 (3), 339-350.

Querfelli, O.; Ishida, M.; Shinozaki, H.; Nakanishi, K.; Ohfune, Y. Efficient Synthesis of 4-Methylene-L-Glutamic Acid and Its Analogues. Synlett 1993, 1993 (6), 409-410.

Wailes, P. C.; Whiting, M. C. Research on Acetylenic Compounds. Part LI. The Syntheses of y-Methyleneglutamic Acid and y-Methyleneglutamine. J. Chem. Soc. 1955, 3636-3641.

Gershon, H.; Meek, J. S.; Dittmer, K. ibid. 1949, 3573.

Baldwin, J. E.; Adlington, R. M.; Robinson, N. G. Nucleophilic Ring Opening of Aziridine-2-Carboxylates with Wittig Reagents; an Enantioefficient Synthesis of Unsaturated Amino Acids. J. Chem. Soc. Chem. Commun. 1987, No. 3, 153-155.

Moody, C. M.; Young, D. W. Synthesis of Naturally Occurring 4-Alkylideneglutamic Acids. Tetrahedron Lett. 1993, 34 (29), 4667-4670.

Eacquerra, J.; Pedregal, C.; Mic6, I.; Najera, C. Efficient Synthesis of 4-Methylene-L-Glutamic Acid and Its Cyclopropyl Analogue. Tetrahedron: Asymmetry 1994, 5 (5), 921-926.

Riofski, M. V.; John, J. P.; Zheng, M. M.; Kirshner, J.; Colby, D. A. Exploiting the Facile Release of Trifluoroacetate for the a-Methylenation of the Sterically Hindered Carbonyl Groups on (+)-Sclareolide and (−)-Eburnamonine. J. Org. Chem. 2011, 76 (10), 3676-3683.

Durand, X.; Hudhomme, P.; Khan, J. A.; Young, D. W. Two Independent Syntheses of (2S,4S)- and (2S,4R)-[5,5-2H2]-5,5′-Dihydroxyleucine. Tetrahedron Lett. 1995, 36 (8), 1351-1354.

Hossain, M. I.; Hanashima, S.; Nomura, T.; Lethu, S.; Tsuchikawa, H.; Murata, M.; Kusak.a, H.; Kita, S.; Maenaka, K. Synthesis and Thl-Immunostimulatory Activity of a-Galactosylceramide Analogues Bearing a Halogen-Containing or Selenium-Containing Acyl Chain. Bioorg. Med. Chem. 2016, 24 (16), 3687-3695.

Shukla, K.; Ferraris, D. V; Thomas, A. G.; Stathis, M.; Duvall, B.; Delahanty, G.; Alt, J.; Rais, R.; Rojas, C.; Gao, P.; Kiang, Y.; Dang, C. V; Slusher, B. S.; Tsukamoto, T. Design, Synthesis, and Pharmacological Evaluation of Bis-2-(5-Phenylacetamido-l,2,4-Thiadiazol-2-Yl)Ethyl Sulfide 3 (BPTES) Analogs as Glutaminase Inhibitors. J. Med. Chem. 2012, 55 (23), 10551-10563.

Ioka, S.; Saitoh, T.; Iwano, S.; Suzuki, K.; Maki, S. A.; Miyawaki, A.; Imoto, M.; Nishiyama, S. Synthesis of Firefly Luciferin Analogues and Evaluation of the Luminescent Properties. Chem.—A Eur. J. 2016, 22 (27), 9330-9337.

Chiha, S.; Soicke, A.; Barone, M.; Muller, M.; Bruns, J.; Opitz, R.; Neudorfl, J.-M.; Kuhne, R.; Schmalz, H.-G. Design and Synthesis of Building Blocks for PPII-Helix Secondary-Structure Mimetics: A Stereoselective Entry to 4-Substituted 5-Vinylprolines. European J. Org. Chem. 2018, 2018 (4), 455-460.

Written Opinion of the International Searching Authority for PCT/US2020/041839 mailed Oct. 20, 2020.

International Search Report of the International Searching Authority for PCT/US2020/041839 mailed Oct. 20, 2020.

Alonezi, S. et al., "Metabolomic Profiling of the Synergistic Effects of Melittin in Combination with Cisplatin on Ovarian Cancer Cells", Metabolites, 2017, vol. 7, No. 2, Article No. 14 (internal pp. 1-18) table 1.

Wang, J. et al., "Identification of potential plasma biomarkers and metabolic dysfunction for unstable angina pectoris and its complication based on global metabolomics", Bioscience Reports, Mar. 22, 2019, vol. 39, Article No. BSR20181658 (internal pp. 1-10) table 2.

Deska, J. et al., "Stereoselective Syntheses and Reactions of Stannylated Peptides", Angewandte Chemie International Edition, 2007, vol. 46, No. 24, pp. 4570-4573 the whole document.

* cited by examiner

# L-γ-METHYLENEGLUTAMINE COMPOUNDS AND METHODS OF USE

CROSS REFERENCE TO RELATED APPLICATIONS

This application is a U.S. national phase application under 35 U.S.C. 371 of International Patent Application No. PCT/US2020/041839, filed Jul. 13, 2020, which claims priority upon U.S. Provisional Application No. 62/873,586, filed on Jul. 12, 2019, both of which are incorporated herein by reference in their entirety.

TECHNICAL FIELD

The present invention relates to L-γ-methyleneglutamine compounds and methods of use thereof. In particular, the presently disclosed subject matter relates to L-γ-methyleneglutamine, L-γ-methyleneglutamic acid, and/or amide derivatives, and methods of use thereof for anticancer activity.

BACKGROUND AND SUMMARY

While glucose is the primary nutrient for the maintenance and promotion of cell function, glutamine and glutamate (FIG. 1) are considered to be equally important. Glutamine participates in numerous functional activities in cells, including being a substrate for protein synthesis, ureogenesis in the liver, and for hepatic and renal gluconeogenesis. Glutamine has been shown to be a precursor for neurotransmitter synthesis, nucleotide and nucleic acid synthesis, and glutathione production. In addition, glutamine is an oxidative fuel for the immune system, a major source of nitrogen for purine and pyrimidine biosynthesis, and a nitrogen transporter between organs. Many of these functions are done via the formation of glutamate from glutamine. In cancer cells, glutaminolysis is the primary source of biosynthetic precursors, fueling the TCA cycle with glutamine-derived α-ketoglutarate. The enhanced production of α-ketoglutarate is critical to cancer cells as it provides carbons for the citric acid cycle to produce glutathione, fatty acids, and nucleotides, and contributes nitrogens to produce hexosamines, nucleotides, and many nonessential amino acids.

Efforts to inhibit glutamine metabolism in cancer using amino acid analogs have been extensive. There are a number of naturally occurring glutamine analogues, such as azaserine, acivicin, and 6-diazo-5-oxo-L-norleucine (DON) (FIG. 1), that are inhibitors of glutaminase, NAD synthase, CTP synthetase, FGAR aminotransferase, and many other glutamine-dependent enzymes. These compounds have been shown to suppress the growth of a variety of tumors and demonstrate their activity in some clinical trials. However, they have also demonstrated variable degrees of gastrointestinal toxicity, myelosuppression, and neurotoxicity, due to their non-selectivity. In recent years, considerable interest has been focused on the discovery of new agents that selectively target glutamine-consuming processes as well as the development of methods directed at specific nodes of glutamine metabolism.

L-γ-Methyleneglutamine (1) and L-γ-methyleneglutamic acid (2) (FIG. 1) were first isolated from groundnut seedling (*Arachis hypogaea*) in 1952. They showed increased optical rotation in mineral acid, indicating their L configuration. These compounds were also later found in several other quite unrelated species, including tulip bulbs (*Tulipa gerneriana*), hops, and *Amorpha frutocosa* (a species of flowering plant in the legume family, Fabaceae). Both 1 and 2 were shown to be of considerable biochemical importance, playing a major role in nitrogen transport in *Arachis* and *Amorpha* plants. Compound 2 was later shown to exhibit strong central nervous system (CNS) inhibitory activity as well as to be 10 times more potent than L-glutamate as a depolarizing agent on the newborn rat spinal cord.

The synthesis of racemic mixture of 1 and racemic mixture of 2 was reported in 1955 (FIG. 2), starting from diethyl 1-formamidobut-3-yne-1,1-dicarboxylate (11) that was prepared from another publication. The synthesis of the biological relevant isomer 2 was reported several times in the literature by a reaction of homochiral aziridine-2-carboxylates with stabilized Wittig reagents, a 15-step synthesis starting from N-Boc-L-aspartate acid γ-benzyl ester, a reduction of the enaminone product of the reaction between tert-butyl-N-Boc-pyroglutamate and the Bredereck reagent, or a synthetic route via a reaction between the lithium lactam enolate of ethyl N-Boc-pyroglutamate and the Eschemnoser's salt. No synthesis of the biological relevant isomer 1, nor further research on its biological activity has been reported.

Herein we report an efficient synthetic route to L-γ-methyleneglutamine (1) and its amide derivatives (3-10) (FIG. 3). These compounds were evaluated for their anticancer activity on three different breast cancer cell lines: MCF-7 ($ER^+/PR^+/HER2^-$), SK-BR-3 ($ER^-/PR^-/HER2^+$), and triple negative MDA-MB-231. The compounds were also evaluated for their activity on a non-cancerous breast cell line, MCF-10A, as a negative control.

BRIEF DESCRIPTION OF THE DRAWINGS

The presently disclosed subject matter will be better understood, and features, aspects and advantages other than those set forth above will become apparent when consideration is given to the following detailed description thereof. Such detailed description refers to the following drawings, wherein.

Figure 1:
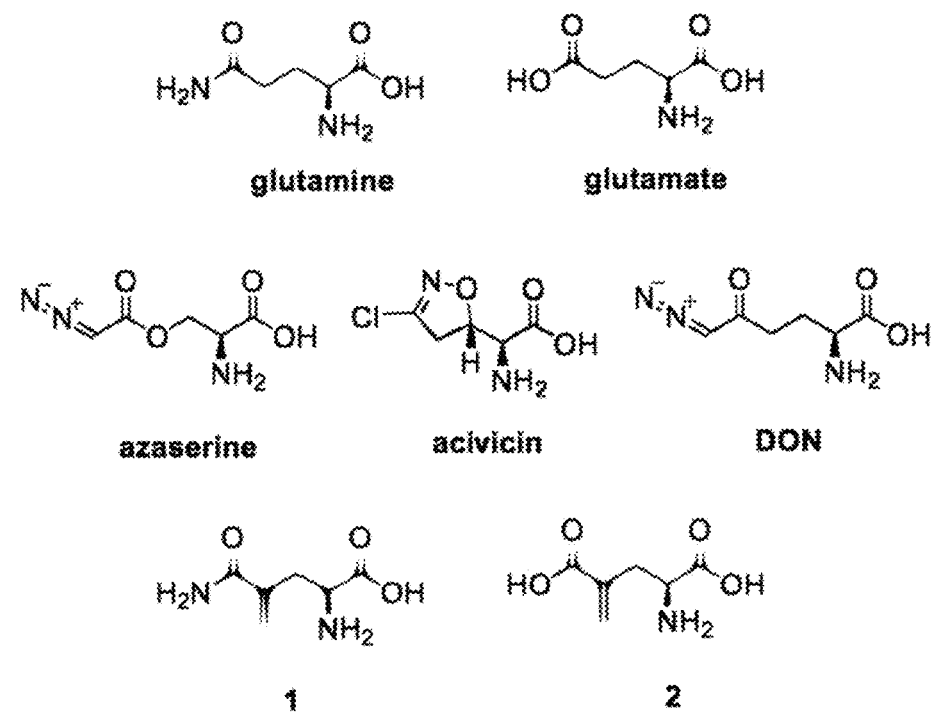
FIG. 1 shows images illustrating the structures of glutamine, glutamate, and various naturally occurring glutamine derivatives.
Figure 2:
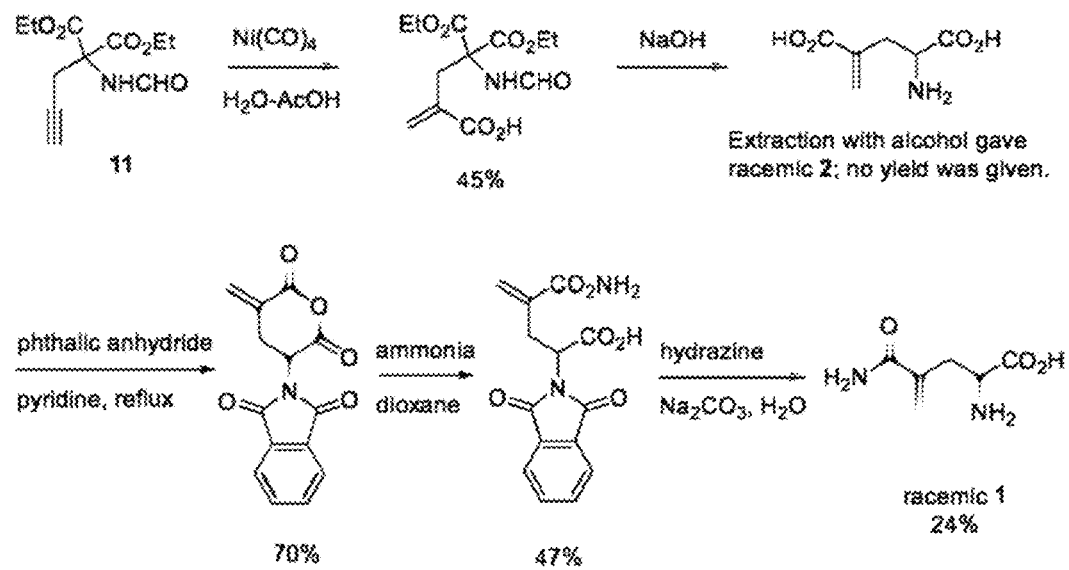
FIG. 2 shows a schematic illustrating synthesis of racemic mixture of 1 and racemic mixture of 2.
Figure 3:
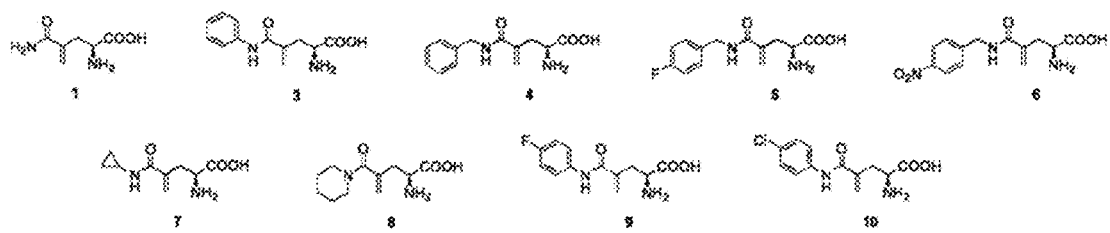
FIG. 3 shows images illustrating the structures of L-γ-methyleneglutamine (1) and its amide derivatives (3-10)

While the disclosure is susceptible to various modifications and alternative forms, specific embodiments thereof have been shown by way of example in the drawings and are herein described below in detail. It should be understood, however, that the description of specific embodiments is not intended to limit the disclosure to cover all modifications, equivalents and alternatives falling within the spirit and scope of the disclosure as defined by the appended claims.

Definitions

Unless defined otherwise, all technical and scientific terms used herein have the same meaning as commonly understood by one of ordinary skill in the art to which the disclosure belongs. Any methods and materials similar to or equivalent to those described herein can be used in the practice or testing of the present disclosure, including the methods and materials are described below.

Following long-standing patent law convention, the terms "a," "an," and "the" refer to "one or more" when used in this application, including the claims. Thus, for example, reference to "a cell" includes a plurality of cells, and so forth.

The terms "comprising," "including," and "having" are intended to be inclusive and mean that there may be additional elements other than the listed elements.

Unless otherwise indicated, all numbers expressing quantities of ingredients, properties such as reaction conditions, and so forth used in the specification and claims are to be understood as being modified in all instances by the term "about." Accordingly, unless indicated to the contrary, the numerical parameters set forth in this specification and claims are approximations that can vary depending upon the desired properties sought to be obtained by the presently disclosed subject matter.

As used herein, the term "about," when referring to a value or to an amount of mass, weight, time, volume, concentration, percentage, or the like is meant to encompass variations of in some embodiments ±50%, in some embodiments ±40%, in some embodiments ±30%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are several values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the term "L-γ-methyleneglutamine compounds" refers to compounds including any suitable γ-methyleneglutamine (e.g. L-γ-methyleneglutamine, or D-γ-methyleneglutamine, or mixture of the two) with one or more substituents attached thereto.

As used herein, the term "lower" refers to a group having between one and six carbons.

As used herein, the term "alkyl" refers to a straight or branched chain hydrocarbon having from one to ten carbon atoms, optionally substituted with substituents selected from the group consisting of lower alkyl, lower alkoxy, lower alkylsulfanyl, lower alkylsulfenyl, lower alkylsulfonyl, oxo, hydroxy, mercapto, azido, isothiocyanate, isocyanate, amino optionally substituted by alkyl, carboxy, carbamoyl optionally substituted by alkyl, aminosulfonyl optionally substituted by alkyl, silyloxy optionally substituted by alkoxy, alkyl, or aryl, silyl optionally substituted by alkoxy, alkyl, or aryl, nitro, cyano, halogen, or lower perfluoroalkyl, multiple degrees of substitution being allowed. Such an "alkyl" group may contain one or more O, S, S(O), or $S(O)_2$ atoms. Examples of "alkyl" as used herein include, but are not limited to, methyl, n-butyl, t-butyl, n-pentyl, isobutyl, and isopropyl, and the like. As used herein, the term haloalkyl refers to a straight or branched chain alkyl having one to four carbon atoms in which at least one H up to all of the H's of the alkyl is substituted with a halo moiety wherein halo includes fluoro, chloro, bromo or iodo.

As used herein, "cycloalkyl" refers to an alicyclic hydrocarbon group optionally possessing one or more degrees of unsaturation, having from three to twelve carbon atoms, optionally substituted with substituents selected from the group consisting of lower alkyl, lower alkoxy, lower alkylsulfanyl, lower alkylsulfenyl, lower alkylsulfonyl, oxo, hydroxy, mercapto, amino optionally substituted by alkyl, carboxy, carbamoyl optionally substituted by alkyl, aminosulfonyl optionally substituted by alkyl, nitro, cyano, halogen, or lower perfluoroalkyl, multiple degrees of substitution being allowed. "Cycloalkyl" includes by way of example cyclopropyl, cyclobutyl, cyclopentyl, cyclohexyl, cycloheptyl, or cyclooctyl, and the like.

As used herein, the term "heterocyclic" or the term "heterocyclyl" refers to a three to twelve-membered heterocyclic ring optionally possessing one or more degrees of unsaturation, containing one or more heteroatomic substitutions selected from S, SO, SO.sub.2, O, or N, optionally substituted with substituents selected from the group consisting of lower alkyl, lower alkoxy, lower alkylsulfanyl, lower alkylsulfenyl, lower alkylsulfonyl, oxo, hydroxy, mercapto, amino optionally substituted by alkyl, carboxy, carbamoyl optionally substituted by alkyl, aminosulfonyl optionally substituted by alkyl, nitro, cyano, halogen, or lower perfluoroalkyl, multiple degrees of substitution being allowed. Such a ring may be optionally fused to one or more of another "heterocyclic" ring(s) or cycloalkyl ring(s). Examples of "heterocyclic" include, but are not limited to, tetrahydrofuran, 1,4-dioxane, 1,3-dioxane, piperidine, pyrrolidine, morpholine, piperazine, tetrahydropyridine, hexahydroazepine and the like.

As used herein, the term "heterocyclyl containing at least one basic nitrogen atom" refers to a "heterocyclic" or "heterocyclyl" group as defined above, wherein said heterocyclyl group contains at least one nitrogen atom flanked by 20 hydrogen, alkyl, alkylene, or alkylyne groups, wherein said alkyl and/or alkylene groups are not substituted by oxo. Examples of "heterocyclyl containing at least one basic nitrogen atom" include, but are not limited to, piperazine-2-yl, pyrrolidine-2-yl, azepine.

As used herein, the term "aryl" refers to a benzene ring or to an optionally substituted benzene ring system fused to one or more optionally substituted benzene rings, optionally substituted with substituents selected from the group consisting of lower alkyl, lower alkoxy, lower alkylsulfanyl, lower alkylsulfenyl, lower alkylsulfonyl, oxo, hydroxy optionally substituted by acyl, mercapto, azido, isothiocyanate, isocyanate, amino optionally substituted by alkyl, carboxy, tetrazolyl, carbamoyl optionally substituted by alkyl, aminosulfonyl optionally substituted by alkyl, acyl, aroyl, heteroaroyl, acyloxy, aroyloxy, heteroaroyloxy, alkoxycarbonyl, silyloxy optionally substituted by alkoxy, alkyl, or aryl, silyl optionally substituted by alkoxy, alkyl, or aryl, nitro, cyano, halogen, or lower perfluoroalkyl, multiple degrees of substitution being allowed. Examples of aryl include, but are not limited to, phenyl, 2-naphthyl, 1-naphthyl, 1-anthracenyl, and the like.

As used herein, the term "arylene" refers to a benzene ring diradical or to a benzene ring system diradical fused to one or more optionally substituted benzene rings, optionally substituted with substituents selected from the group consisting of lower alkyl, lower alkoxy, lower alkylsulfanyl, lower alkylsulfenyl, lower alkylsulfonyl, oxo, hydroxy, mercapto, amino optionally substituted by alkyl, carboxy, tetrazolyl, carbamoyl optionally substituted by alkyl, aminosulfonyl optionally substituted by alkyl, acyl, aroyl, heteroaroyl, acyloxy, aroyloxy, heteroaroyloxy, alkoxycarbonyl, silyloxy optionally substituted by alkoxy, alkyl, or aryl, silyl optionally substituted by alkoxy, alkyl, or aryl, nitro, cyano, halogen, or lower perfluoroalkyl, multiple degrees of substitution being allowed. Examples of "arylene" include, but are not limited to, benzene-1,4-diyl, naphthalene-1,8-diyl, and the like.

As used herein, the term "heteroaryl" refers to a five- to seven-membered aromatic ring, or to a polycyclic heterocyclic aromatic ring, containing one or more nitrogen, oxygen, or sulfur heteroatoms, where N-oxides and sulfur monoxides and sulfur dioxides are permissible heteroaromatic substitutions, optionally substituted with substituents selected from the group consisting of lower alkyl, lower alkoxy, lower alkylsulfanyl, lower alkylsulfenyl, lower alkylsulfonyl, oxo, hydroxy, mercapto, amino optionally substituted by alkyl, carboxy, tetrazolyl, carbamoyl optionally substituted by alkyl, aminosulfonyl optionally substituted by alkyl, acyl, aroyl, heteroaroyl, acyloxy, aroyloxy, heteroaroyloxy, alkoxycarbonyl, silyloxy optionally substituted by alkoxy, alkyl, or aryl, silyl optionally substituted by alkoxy, alkyl, or aryl, nitro, cyano, halogen, or lower perfluoroalkyl, multiple degrees of substitution being allowed. For polycyclic aromatic ring systems, one or more of the rings may contain one or more heteroatoms. Examples of "heteroaryl" used herein are furan, thiophene, pyrrole, imidazole, pyrazole, triazole, tetrazole, thiazole, oxazole, isoxazole, oxadiazole, thiadiazole, isothiazole, pyridine, pyridazine, pyrazine, pyrimidine, quinoline, isoquinoline, quinazoline, benzofuran, benzothiophene, indole, and indazole, and the like.

As used herein, the term "protecting group" refers to Carbobenzyloxy (Cbz); p-Methoxybenzyl carbonyl (Moz or MeOZ); tert-Butyloxycarbonyl (BOC); 9-Fluorenylmethyloxycarbonyl (Fmoc); Acetyl (Ac); Benzoyl (Bz); Benzyl (Bn); Carbamate; p-Methoxybenzyl; 3,4-Dimethoxybenzyl (DMPM); p-Methoxyphenyl (PMP); Tosyl (Ts); Troc (trichloroethyl chloroformate).

The term "aryl group" used alone or as part of a larger moiety as in "aralkyl", "aralkoxy", or "aryloxyalkyl", includes carbocyclic aromatic rings and heteroaryl rings. The term "aromatic group" may be used interchangeably with the terms "aryl", "aryl ring" "aromatic ring", "aryl group" and "aromatic group". An aromatic group typically has from six to fourteen ring atoms. A "substituted aryl group" is substituted at any one or more substitutable ring atom.

The terms "halogen" or "halo" shall mean an atom selected from fluorine, chlorine, bromine and iodine.

The term "heteroaryl", "heteroaromatic", "heteroaryl ring", "heteroaryl group" and "heteroaromatic group", used alone or as part of a larger moiety as in "heteroaralkyl" or "heteroarylalkoxy", refers to aromatic ring groups having five to fourteen ring atoms selected from carbon and at least one (typically 1-4, more typically 1 or 2) heteroatom (e.g., oxygen, nitrogen or sulfur). They include monocyclic rings and polycyclic rings in which a monocyclic heteroaromatic ring is fused to one or more other carbocyclic aromatic or heteroaromatic rings. Examples of monocyclic heteroaryl groups include furanyl (e.g., 2-furanyl, 3-furanyl), imidazolyl (e.g., N-imidazolyl, 2-imidazolyl, 4-imidazolyl, 5-imidazolyl), isoxazolyl(e.g., 3-isoxazolyl, 4-isoxazolyl, 5-isoxazolyl), oxadiazolyl (e.g., 2-oxadiazolyl, 5-oxadiazolyl), oxazolyl (e.g., 2-oxazolyl, 4-oxazolyl, 5-oxazolyl), pyrazolyl (e.g., 3-pyrazolyl, 4-pyrazolyl), pyrrolyl (e.g., 1-pyrrolyl, 2-pyrrolyl, 3-pyrrolyl), pyridyl (e.g., 2-pyridyl, 3-pyridyl, 4-pyridyl), pyrimidinyl (e.g., 2-pyrimidinyl, 4-pyrimidinyl, 5-pyrimidinyl), pyridazinyl (e.g., 3-pyridazinyl), thiazolyl (e.g., 2-thiazolyl, 4-thiazolyl, 5-thiazolyl), triazolyl (e.g., 2-triazolyl, 5-triazolyl), tetrazolyl (e.g., tetrazolyl) and thienyl (e.g., 2-thienyl, 3-thienyl. Examples of monocyclic six-membered nitrogen-containing heteroaryl groups include pyrimidinyl, pyridinyl and pyridazinyl. Examples of polycyclic aromatic heteroaryl groups include carbazolyl, benzimidazolyl, benzothienyl, benzofuranyl, indolyl, quinolinyl, benzotriazolyl, benzothiazolyl, benzoxazolyl, benzimidazolyl, isoquinolinyl, indolyl, isoindolyl, acridinyl, or benzisoxazolyl.

The term "substituted" shall mean the replacement of one or more hydrogen atoms in a given structure with a substituent including, but not limited to, halo, alkyl, alkenyl, alkynyl, aryl, heterocyclyl, thiol, alkylthio, arylthio, alkylthioalkyl, arylthioalkyl, alkylsulfonyl, alkylsulfonylalkyl, arylsulfonylalkyl, alkoxy, aryloxy, aralkoxy, aminocarbonyl, alkylaminocarbonyl, arylaminocarbonyl, alkoxycarbonyl, aryloxycarbonyl, haloalkyl, amino, trifluoromethyl, cyano, nitro, alkylamino, arylamino, alkylaminoalkyl, arylaminoalkyl, aminoalkylamino, hydroxy, alkoxyalkyl, carboxyalkyl, alkoxycarbonylalkyl, aminocarbonylalkyl, acyl, aralkoxycarbonyl, carboxylic acid, sulfonic acid, sulfonyl, phosphonic acid, aryl, heteroaryl, heterocyclic, or aliphatic. It is understood that the substituent may be further substituted.

All combinations of method or process steps as used herein can be performed in any order, unless otherwise specified or clearly implied to the contrary by the context in which the referenced combination is made.

DETAILED DESCRIPTION

The details of one or more embodiments of the presently disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

The present invention relates to substantially pure L-γ-methyleneglutamine, L-γ-methyleneglutamic acid, and/or amide derivatives thereof comprising a structure according to Formula I:

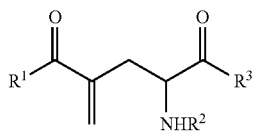

I wherein $R^1$ includes OH, $NH_2$, $C_1$-$C_5$ optionally substituted straight chain or branched lower alkoxy, optionally substituted aryloxy, optionally substituted hetaryloxy or $NHR^4$; $R^2$ includes H or an amine protecting group; $R^3$ includes OH, optionally substituted lower alkoxy, optionally substituted aryloxy or optionally substituted hetaryloxy; and $R^4$ includes optionally substituted aryl, optionally substituted hetaryl or optionally substituted $C_2$-$C_7$ cycloalkyl.

A preferred group of compounds are those compounds of formula I, wherein $R^1$ includes OH, $NH_2$, alkoxy or $NHR^4$; $R^2$ includes H or tert-butoxycarbonyl (BOC); $R^3$ includes OH, tert-butoxy or $OCH_2CH_3$; and $R^4$ includes substituted or unsubstituted aryl, phenyl, benzyl, cycloalkyl, cyclopropyl or —$(CH_2)_4$—.

Another preferred compound is a compound of formula I wherein $R^4$ is substituted and a further preferred compound is a compound in which $R^4$ is substituted with one or more of a halogen haloalkyl or $NO_2$. A still yet further preferred compound is a compound of formula I in which $R^4$ includes a F or Cl or haloalkyl substituted aryl and yet further a compound in which wherein $R^4$ includes a $NO_2$ substituted aryl.

A further aspect of the is invention is a compound of formula II

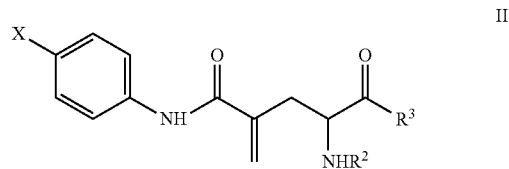

II wherein X includes H, halogen, haloalkyl, $NO_2$, OH, SH, CN, or COOH.

A yet further aspect of the invention is a compound of the formula III

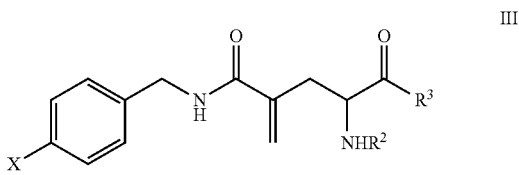

III wherein X includes H, haloalkyl, halogen, $NO_2$, OH, SH, CN, COOH, or CHO.

The present invention also relates a method of treating cancer, the method comprising administering one or more compounds according to formula I, II, or III to a subject in need thereof. The cancer includes, but is not limited to, common cancers, rare cancers, breast cancer, triple-positive breast cancer, ER positive breast cancer, PR positive breast cancer, HER2 positive breast cancer, triple-negative breast cancer, kidney cancer, lung cancer, brain cancer, glioblastoma, head and neck cancer, or a combination thereof.

The presently disclosed subject matter includes compounds comprising L-γ-methyleneglutamine, L-γ-methyleneglutamic acid, and/or amide derivatives thereof according to Formula I:

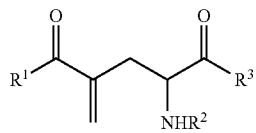

I

Where $R^1$ includes OH, $NH_2$, alkoxy, $NHR^4$; $R^2$ includes H, tert-butoxycarbonyl (BOC); $R^3$ includes OH, tert-butoxy, $OCH_2CH_3$; and $R^4$ includes aryl, phenyl, benzyl, arylalkyl, cycloalkyl, cyclopropyl, —$(CH_2)_4$—. The $R^4$ group may be substituted or unsubstituted. For example, in some embodiments, $R^4$ includes a substituted aryl, substituted benzyl, and/or cycloalkyl. In some embodiments, $R^4$ includes an aryl substituted with one or more halogens. In some embodiments, $R^4$ includes a benzyl substituted with one or more of a halogen or $NO_2$. For example, in some embodiments, $R^4$ includes a F, Cl, $NO_2$, OH, SH, CN, COOH, or CHO substituted aryl. In another example, $R^4$ includes a F, Cl, or NO₂ substituted benzyl. Additionally, or alternatively, in some embodiments, R⁴ is a para-substituted aryl or benzyl. For example, in some embodiments, the compounds include a structure according to Formula II:

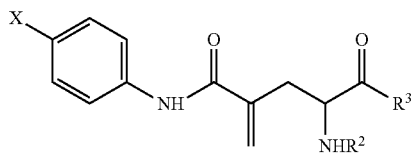

where X includes H, halogen, NO₂, OH, SH, CN, COOH, or CHO. In some embodiments, the compounds include a structure according to Formula III:

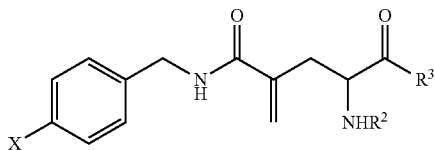

where X includes H, halogen, NO₂, OH, SH, CN, COOH, or CHO.

Also provided herein, in some embodiments, is a method of forming the compounds disclosed herein, including L-γ-methyleneglutamine, L-γ-methyleneglutamic acid, and/or amide derivatives thereof. In some embodiments, the method includes an efficient synthetic route to the compounds of Formula I. In some embodiments, the method includes installment of an amide group directly from the corresponding carboxylic acid using an amide coupling protocol to synthesize compound 1. In some embodiments, a tert-butyl group is used as the protecting group for the carboxylic acid. This protecting group can be removed later using an acid, instead of a base. For example, in one embodiment, synthesis of L-γ-methyleneglutamine includes protecting the carboxylic acid and amide groups of 12 with tert-butyl ester and Boc groups, respectively, to form 17. Next, a methylene group is introduced at C4 via an α-methylenation reaction to give compound 18. The cyclic amide ring is then selectively opened with LiOH to afford the common intermediate 19, followed by installation of amide from ammonium chloride using an amide coupling protocol, resulting in 20. Finally, compound 20 is treated with TFA to remove both tert-butyl and Boc protecting groups, affording the desired L-γ-methyleneglutamine 1.

Figure 6:
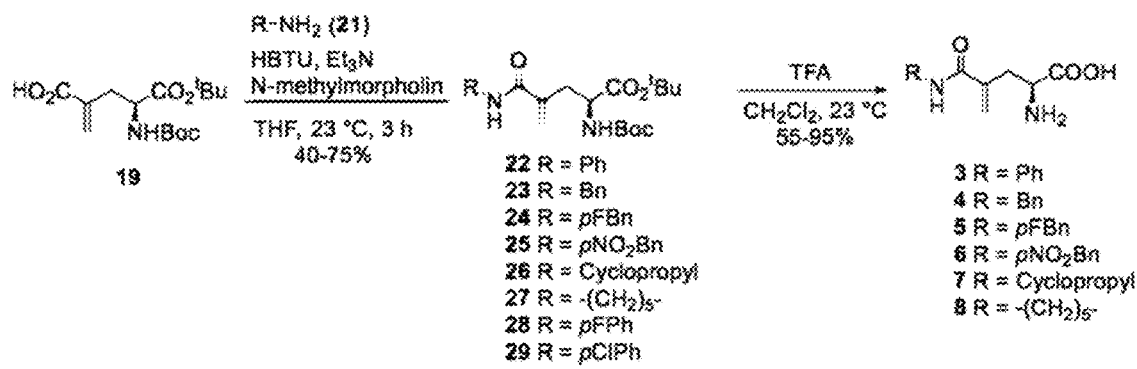
FIG. 6 shows a schematic illustrating synthesis of L-γ-methyleneglutamine amide derivatives 3-8.

In some embodiments, the method includes forming L-γ-methyleneglutamine amide derivatives using the common intermediate 19. The amide coupling protocol accommodates a wide range of functional groups. For example, protected amides 22-29 may be synthesized via the amide coupling protocol using 19 and the corresponding amines (21) (FIG. 6). In some embodiments, removing the tert-butyl and Boc protecting groups from 22-27 includes treating the compounds with TFA to form the desired deprotected amides 3-8 (FIG. 6). In some embodiments, forming the 4-substituted phenyl amides 9-10 includes treating 28-29 with a milder acid, H₃PO₄. In some embodiments, forming 9-10 includes treating 28-29 with a neutral deprotection condition, ZnBr₂ in DCM. In some embodiments, the method also includes purifying the desired deprotected amides 9-10 via both silica gel flash column and HPLC.

Further provided herein, in some embodiments, are methods of treating a disease, such as cancer, using the compounds disclosed herein. In some embodiments, the method includes administering one or more of the compounds disclosed herein to a subject in need thereof. In some embodiments, the subject has cancer, including, but not limited to, common cancers, rare cancers, breast cancer, triple-positive breast cancer, ER positive breast cancer, PR positive breast cancer, HER2 positive breast cancer, triple-negative breast cancer, kidney cancer, lung cancer, brain cancer, glioblastoma, head and neck cancer, or a combination thereof. In some embodiments, the compounds inhibit the uptake of glutamine in cancer cells. In some embodiments, the compounds are at least as efficacious as tamoxifen or olaparib at arresting cell growth among MCF-7 (ER⁺/PR⁺/HER2⁻) breast cancer cells and SK-BR-3 (ER⁺/PR⁺/HER2⁺) breast cancer cells. In some embodiments, the compounds are at least as efficacious as olaparib at arresting cell growth among triple-negative MDA-MB-231 breast cancer cells.

The presently disclosed subject matter is further illustrated by the following specific but non-limiting examples. The following examples may include compilations of data that are representative of data gathered at various times during development and experimentation related to the presently disclosed subject matter.

EXAMPLES

Example 1

In cancer cells, glutaminolysis is the primary source of biosynthetic precursors, fueling the TCA cycle with glutamine-derived a-ketoglutarate. The enhanced production of α-ketoglutarate is critical to cancer cells as it provides carbons for the citric acid cycle to produce glutathione, fatty acids, and nucleotides, and contributes nitrogens to produce hexosamines, nucleotides, and many nonessential amino acids. Efforts to inhibit glutamine metabolism in cancer using amino acid analogs have been extensive. L-γ-Methyleneglutamine was shown to be of considerable biochemical importance, playing a major role in nitrogen transport in *Arachis* and *Amorpha* plants.

This Example describes the development of a novel efficient synthetic route to L-γ-methyleneglutamine and its amide derivatives. This Example also describes the efficacy of these compounds as compared to existing cancer treatment drugs. More specifically, many of these compounds were shown to be as efficacious as tamoxifen or olaparib at arresting cell growth among MCF-7 (ER⁺/PR⁺/HER2⁺) breast cancer cells and SK-BR-3 (ER⁺/PR⁺/HER2⁺) breast cancer cells at 24 or 72 h. Several of these compounds were as efficacious as olaparib at arresting cell growth among triple-negative MDA-MB-231 cancer cells at 72 h. Without wishing to be bound by theory, it is believed that the mechanism of action for growth inhibition by these compounds involves cytotoxicity.

Results and Discussion

Synthesis of L-γ-Methyleneglutamine and its Amide Derivatives

Figure 4:
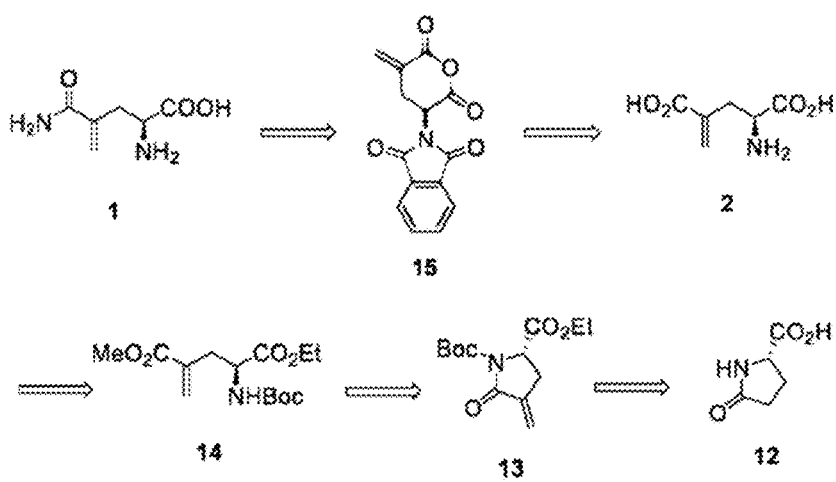
FIG. 4 shows a schematic illustrating an original synthetic plan for L-γ-methyleneglutamine (1).

In an initial attempt to synthesize L-γ-methyleneglutamine (1), part of the synthetic route was based on the previously reported synthesis of the racemic mixture of 1, going through the formation of the corresponding phthalimido-anhydride 15 (FIG. 4). The synthetic route was started with commercially available L-pyroglutamic acid (12). The carboxylic acid and amide groups of 12 were first protected by ethyl ester and tert-butoxycarbonyl (BOC) group, respectively. Then, the methylene group was introduced at C4 via α-methylenation of the sterically hindered carbonyl group to give 13. Hydrolysis of 13 with LiOMe opened the lactam ring; however, an esterification also occurred at the newly formed acid group to form 14. Hydrolysis of 14 with 9M HBr resulted in 2 in a mixture with other side products that were very difficult to purify 2 from. The crude mixture of 2 was then used to react with phthalic anhydride to try to synthesize the phthalimido-anhydride 15. Despite efforts with many different reaction conditions, the formation of 15 was not detected. As such, the initial synthetic plan to 1 showed in FIG. 4 was abandoned. The inability of this plan to synthesize the desired compounds further evidences the non-obviousness of the compounds and methods disclosed herein.

Figure 5:
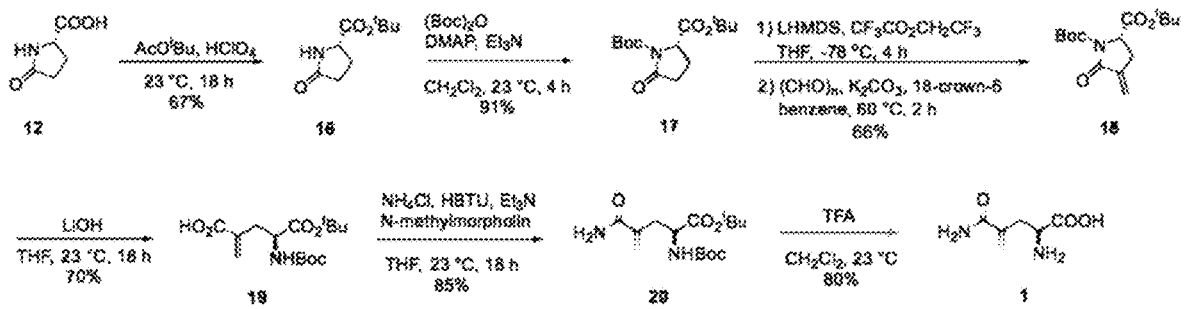
FIG. 5 shows a schematic illustrating synthesis of L-γ-methyleneglutamine 1.

Following the abandonment of the initial plan, it was decided to utilize an installment of the amide group directly from the corresponding carboxylic acid using an amide coupling protocol in the synthetic route to 1. It was also decided to utilize tert-butyl group as the protecting group for the carboxylic acid, so that an acid could be used to remove it later, instead of a base. Using this approach compound 1 was successfully synthesized from the commercially available L-pyroglutamic acid (12) (FIG. 5). The carboxylic acid and amide groups of 12 were first protected by tert-butyl ester and Boc group, respectively. Then, the methylene group was introduced at C4 via α-methylenation of the sterically hindered carbonyl group to give 18 in 66% yield. The cyclic amide ring was selectively opened with LiOH to afford the common intermediate 19 in 70% yield. Amide was then installed to 19 from ammonium chloride using an amide coupling protocol, resulting in 20 in 85% yield. Treatment of 20 with TFA removed both tert-butyl and Boc protecting groups, affording the desired L-γ-methyleneglutamine 1 in 80% yield.

Figure 7:
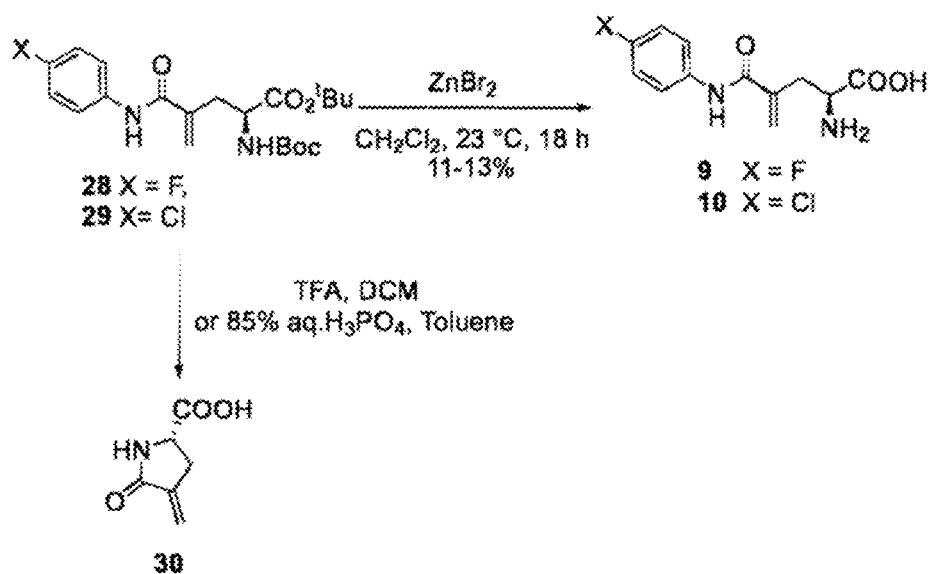
FIG. 7 shows a schematic illustrating deprotection of compounds 28 and 29 via acidic and neutral conditions and synthesis of L-γ-methyleneglutamine amide derivatives 9 and 10.

In a similar fashion, a library of L-γ-methyleneglutamine amide derivatives was quickly generated using the common intermediate 19. The amide coupling protocol was observed to accommodate a wide range of functional groups. Protected amides 22-29 were synthesized via the amide coupling protocol using 19 and the corresponding amines (21) (FIG. 6). The removal of the tert-butyl and Boc protecting groups using TFA was less accommodating. While the desired deprotected amides 3-8 were obtained in good yields from treating the corresponding 22-27 with TFA (FIG. 6), the 4-substituted phenyl amides 9-10 were not formed. Upon treating with TFA, the corresponding 28-29 quickly underwent cyclization, producing 30 instead (FIG. 7). When a milder acid, $H_3PO_4$, was used, some 9-10 were detected by LC-MS, but 30 was still the major product. When a neutral deprotection condition, $ZnBr_2$ in DCM, was used, the desired deprotected amides 9-10 were obtained in 11-13% yields after purification via both silica gel flash column and HPLC.

Figure 8:
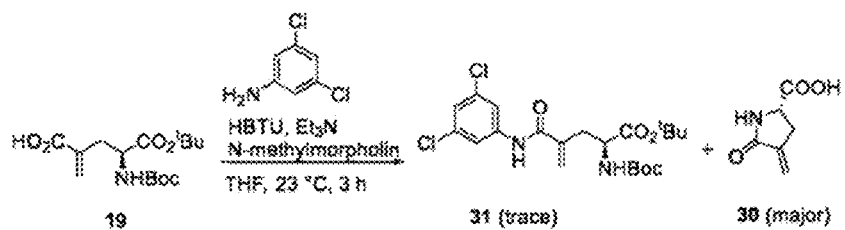
FIG. 8 shows a schematic illustrating the result of a coupling reaction between compound 19 and 3,5-dichloroaniline.
Figures 9A, 9B, 9C, 9D:
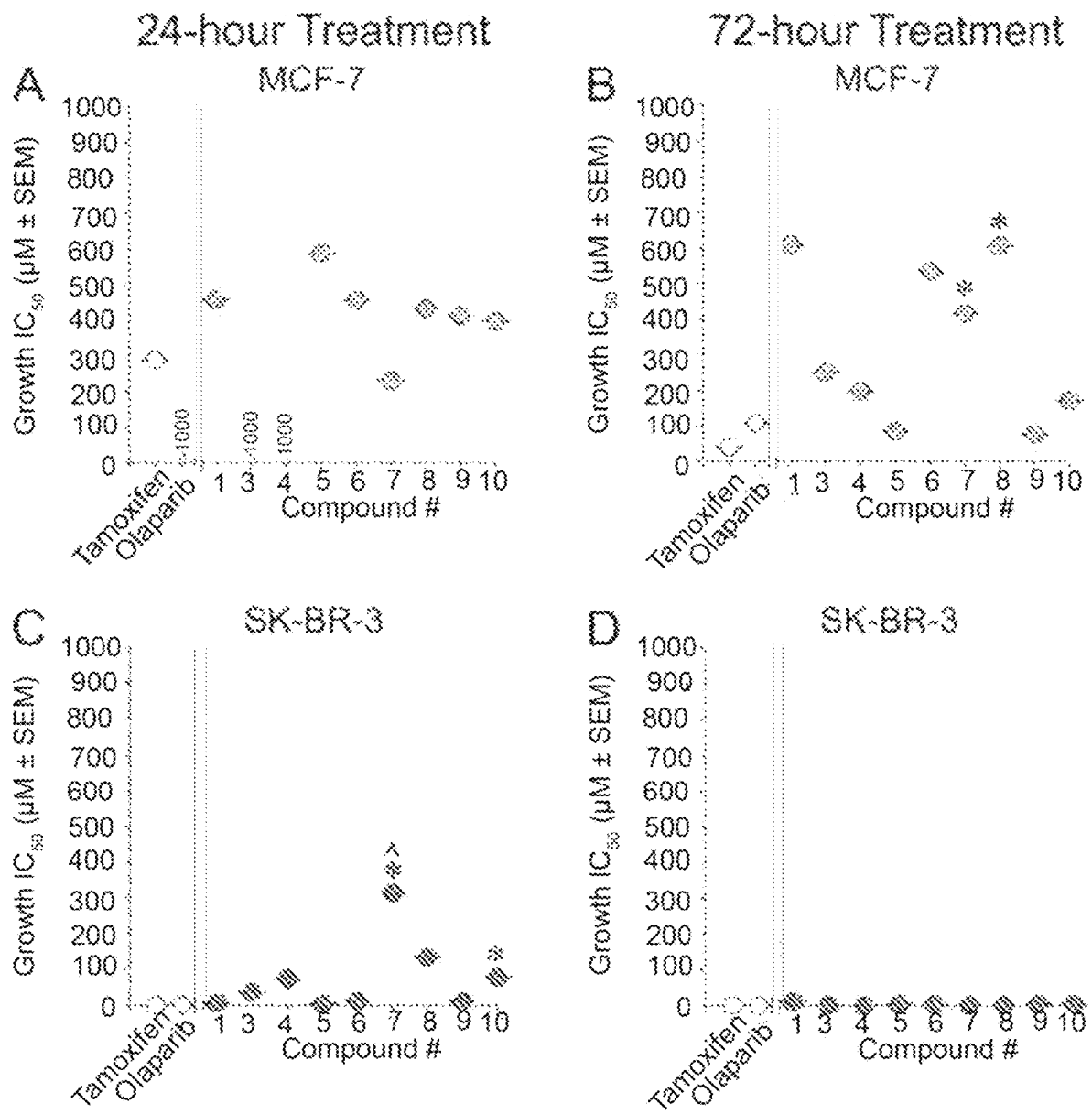
FIG. 9 shows plots illustrating concentrations that produced half-maximal inhibition of cell growth ($IC_{50}$) after 24 h (left) or 72 h (right) exposure to a dose-response regimen (0.32-320 μM) of compounds 1, 3-10, or positive controls (tamoxifen or olaparib). Lesser $IC_{50}$ indicates increased potency. $IC_{50}$ was determined for MCF-7 (A, B), SK-BR-3 (C, D), or MDA-MB-231 (E, F) breast cancer cells, as well as MCF-10A non-cancerous breast cells (G, H). * significantly different from tamoxifen. ˆ significantly different from olaparib, p<0.05.
Figure 9E:
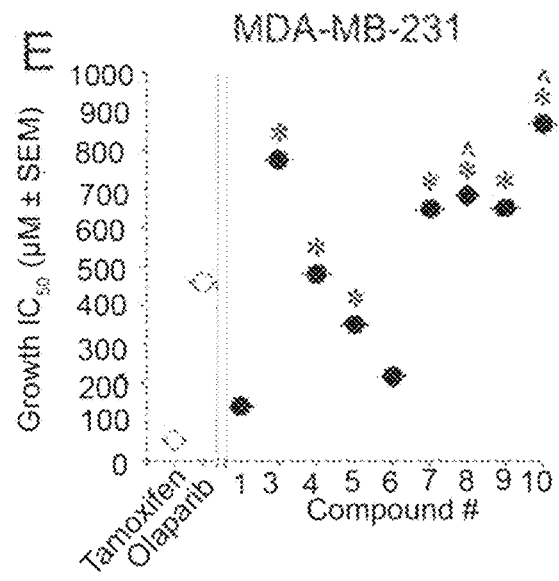
Figure 9F:
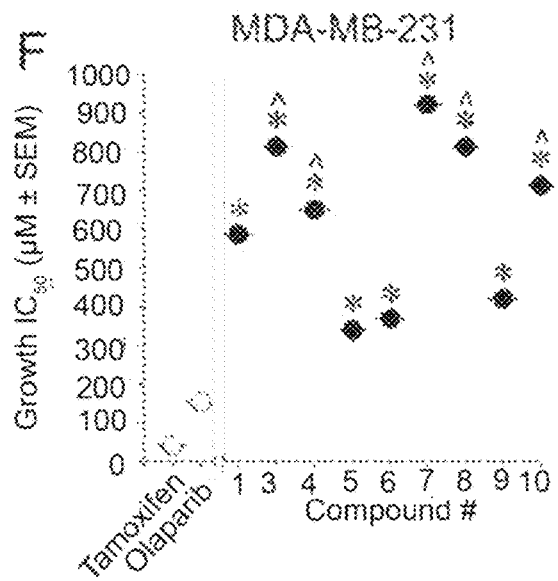
Figure 9G:
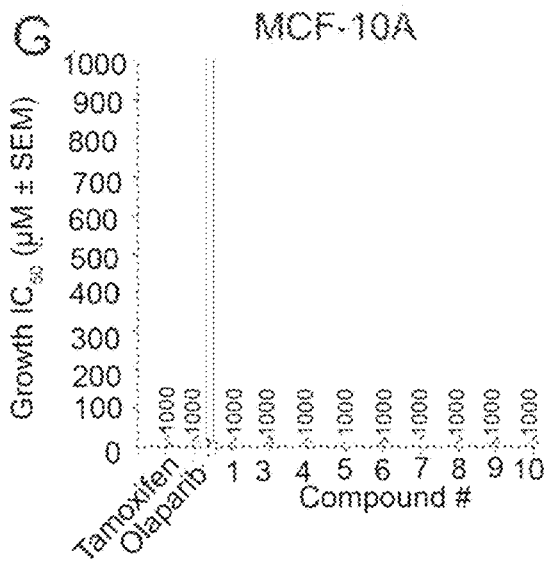
Figure 9H:
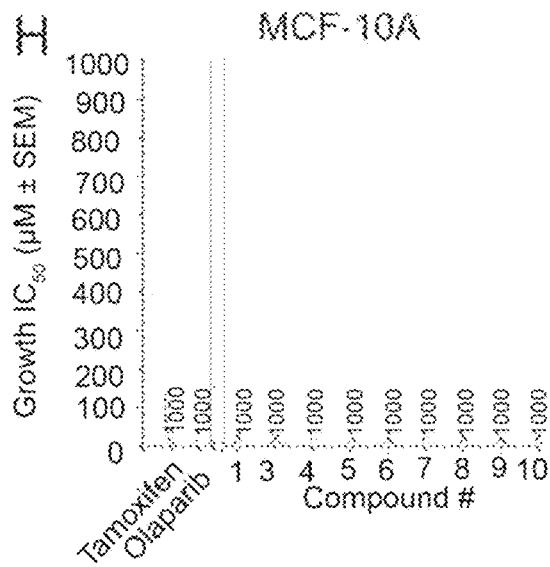
Figures 10A, 10B, 10C, 10D:
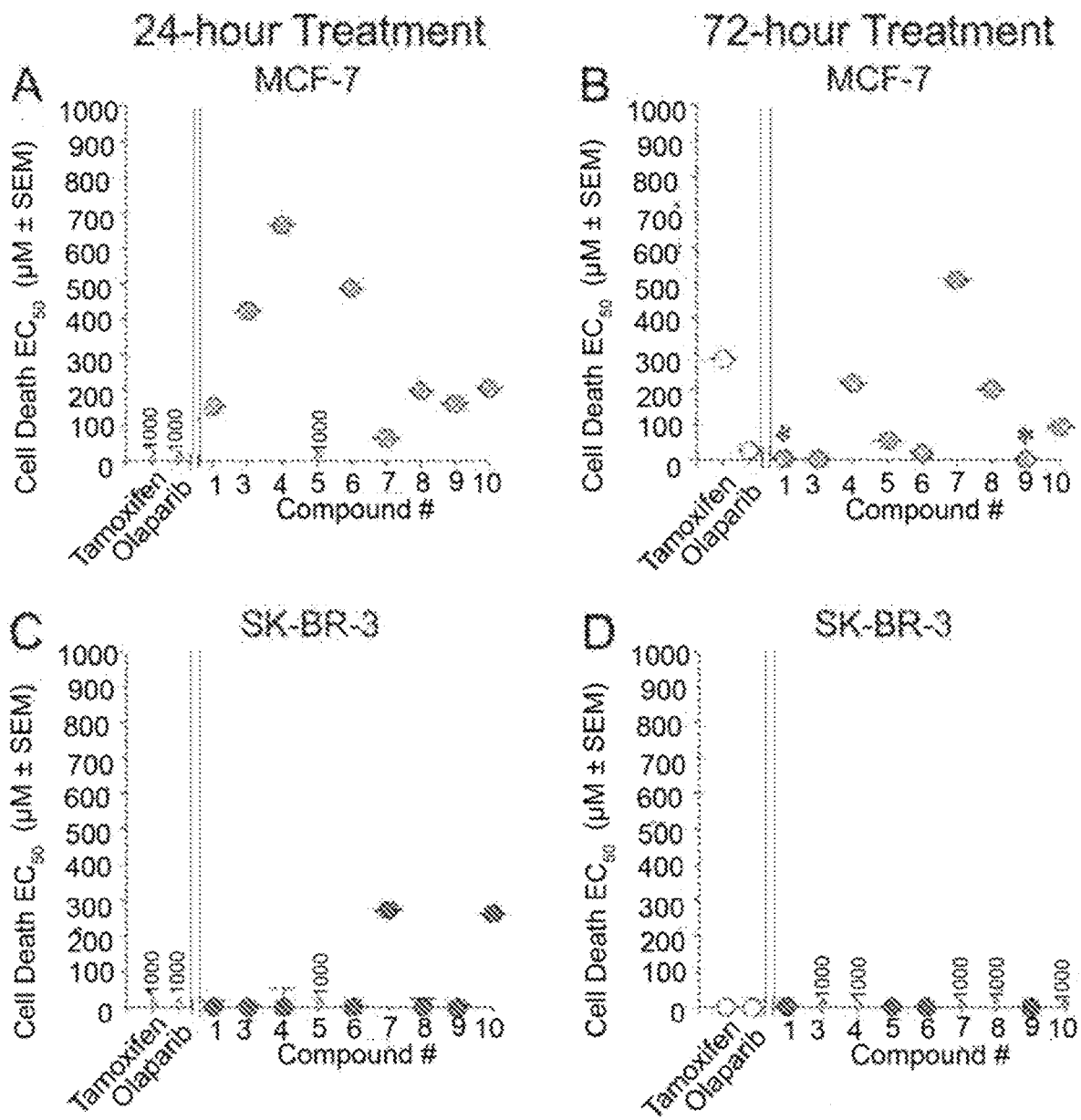
FIG. 10 shows plots illustrating concentrations that produced half-maximal effect for cell death ($EC_{50}$) after 24 h (left) or 72 h (right) exposure to a dose-response regimen (0.32-320 µM) of compounds 1, 3-10, or positive controls (tamoxifen or olaparib). Lesser $EC_{50}$ indicates increased cytotoxicity. $EC_{50}$ was determined for MCF-7 (A, B), SK-BR-3 (C, D), or MDA-MB-231 (E, F) breast cancer cells, as well as MCF-10A non-cancerous breast cells (G, H). * indicates significantly different from tamoxifen. A indicates significantly different from olaparib, p<0.05.
Figure 10E:
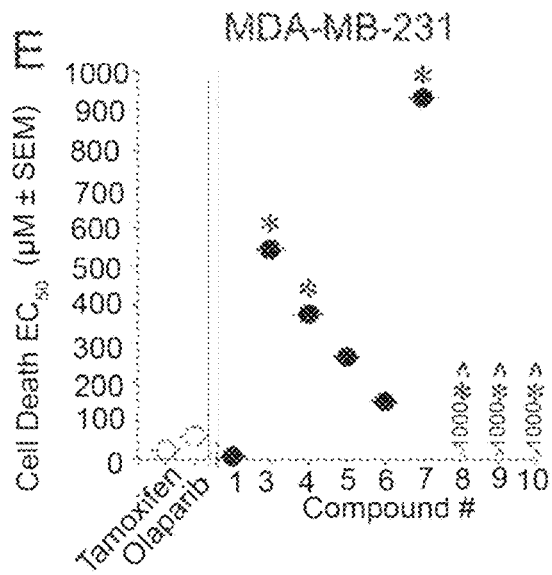
Figure 10F:
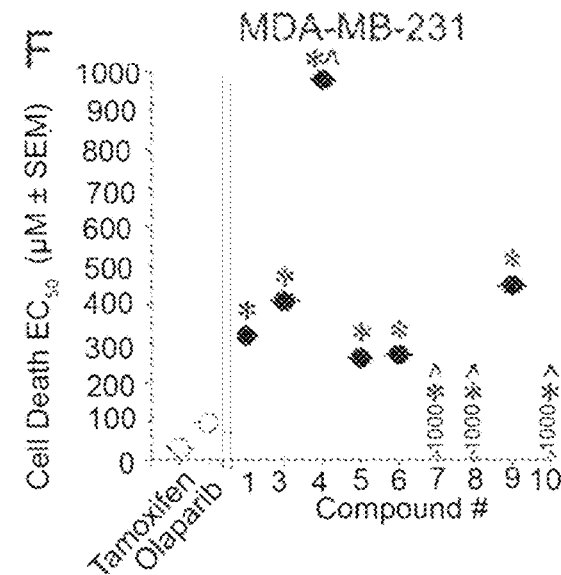
Figure 10G:
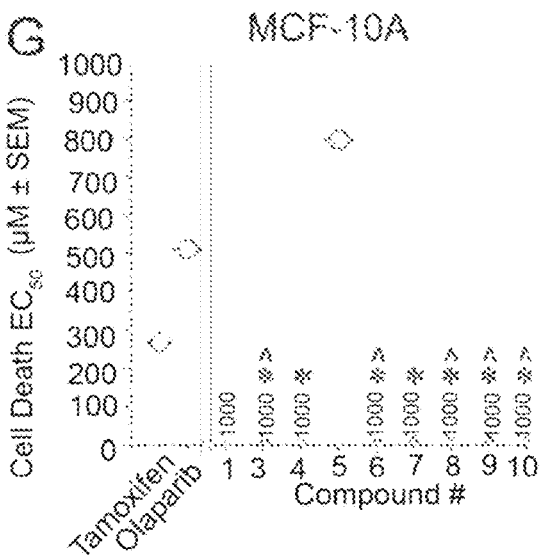
Figure 10H:
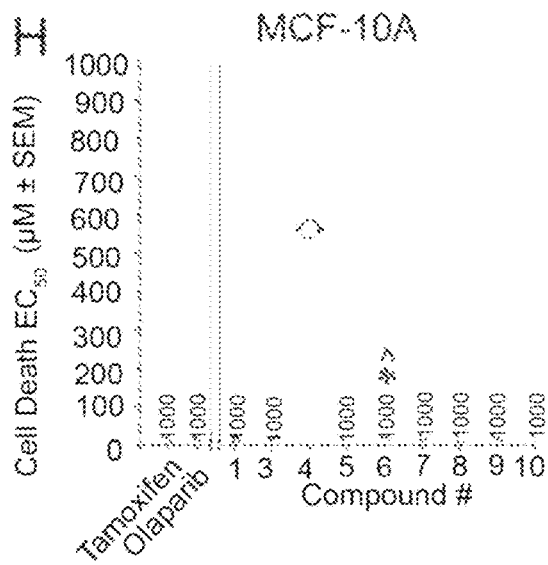
Figure 11:
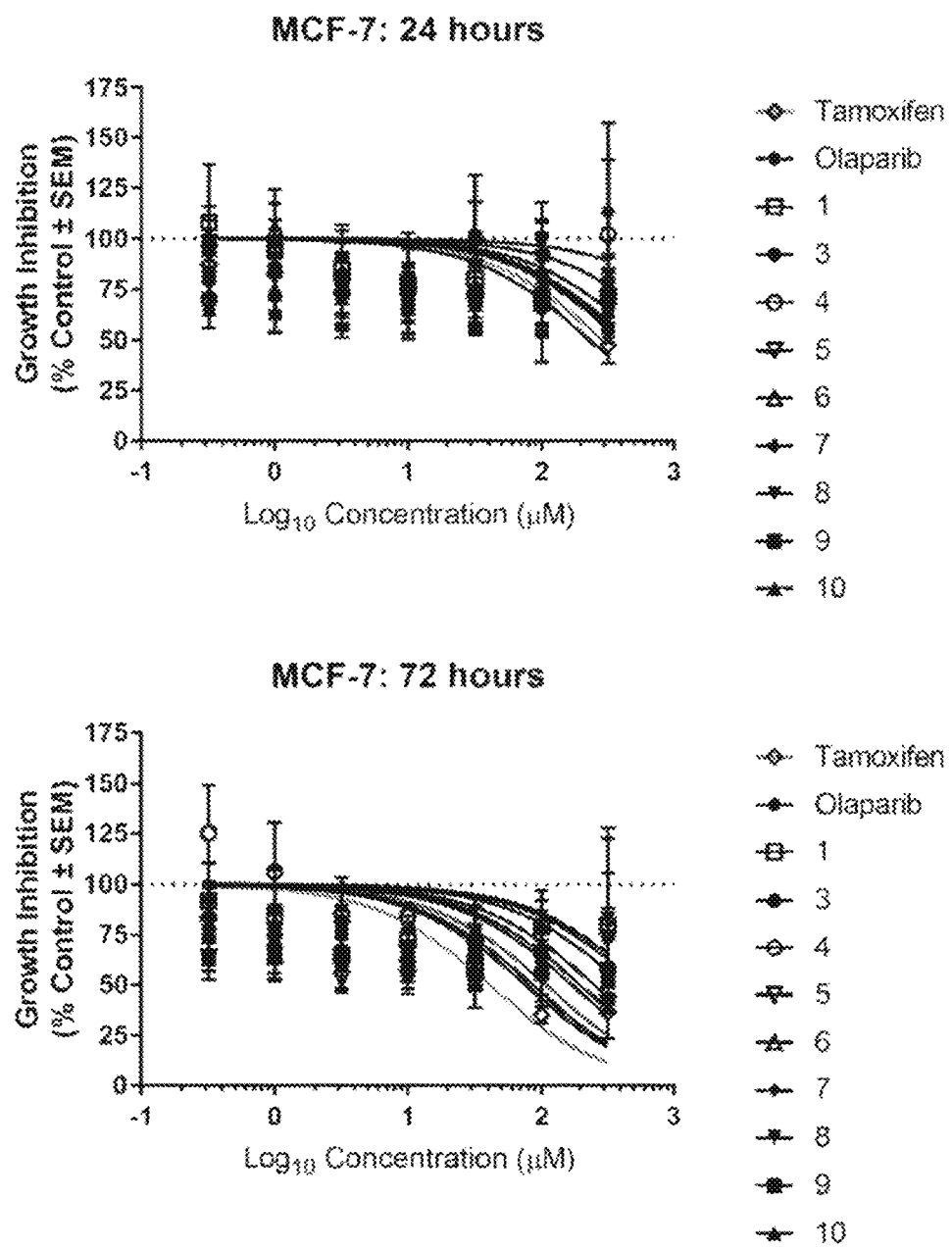
FIG. 11 shows graphs illustrating dose-response (0.32-20 µM) of tamoxifen, olaparib, and compounds 1 and 3-10 on the inhibition of growth of MCF-7 breast cancer cells at 24 h (top) and 72 h (bottom) from treatment.
Figure 12:
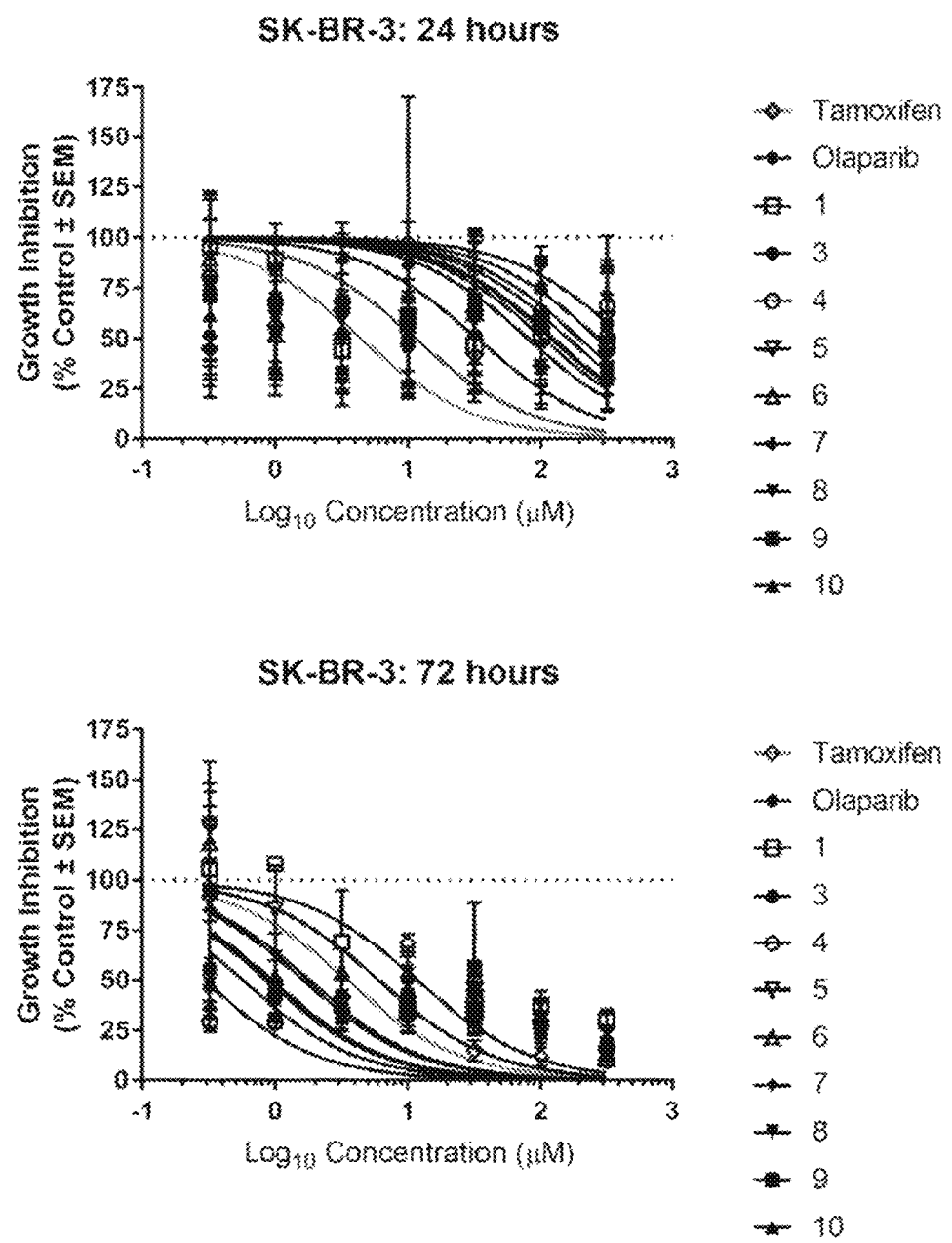
FIG. 12 shows graphs illustrating Dose-response (0.32-20 µM) of tamoxifen, olaparib, and compounds 1 and 3-10 on the inhibition of growth of SK-BR-3 breast cancer cells at 24 h (top) and 72 h (bottom) from treatment.
Figure 13:
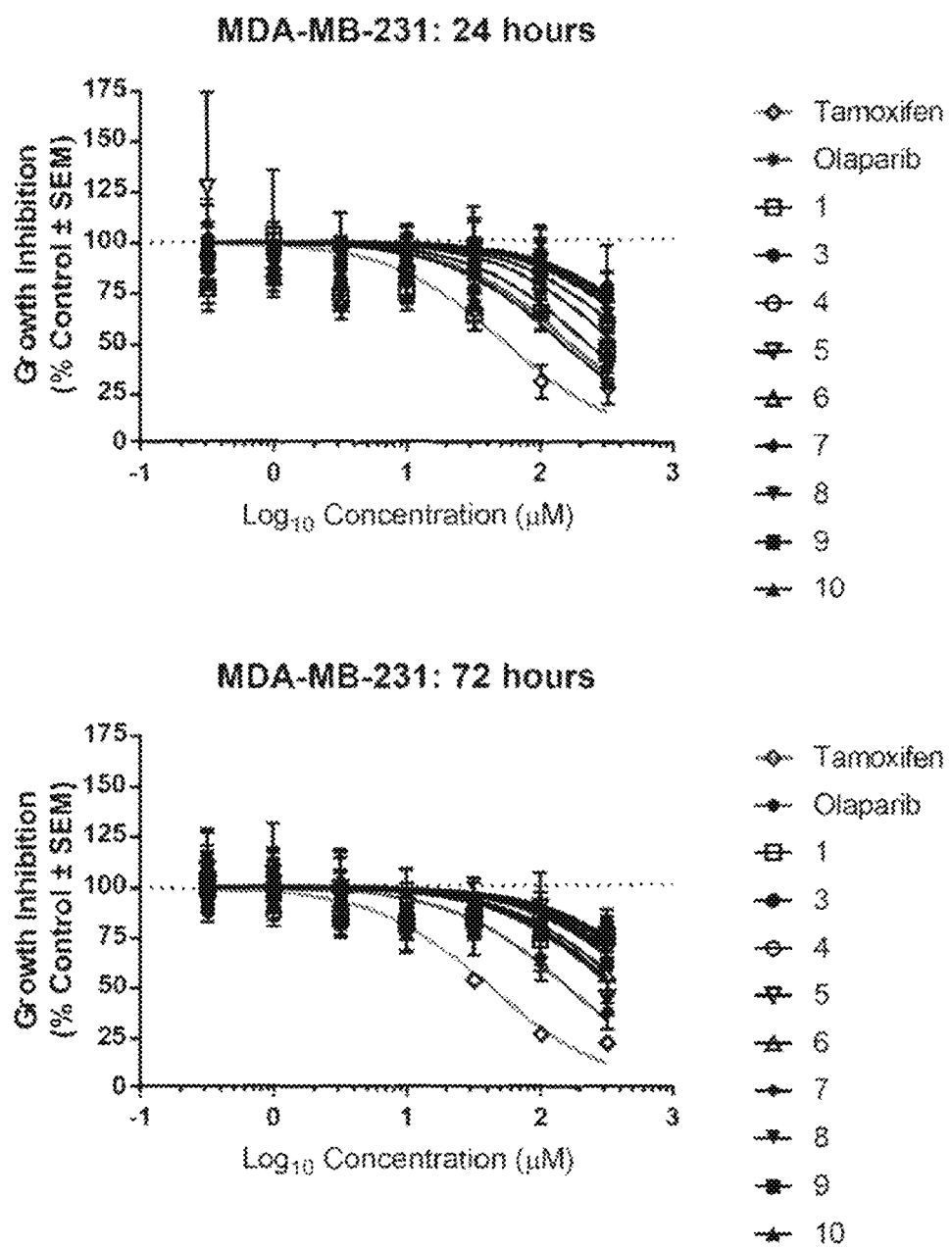
FIG. 13 shows graphs illustrating dose-response (0.32-20 µM) of tamoxifen, olaparib, and compounds 1 and 3-10 on the inhibition of growth of triple-negative MDA-MB-231 breast cancer cells at 24 h (top) and 72 h (bottom) from treatment.
Figure 14:
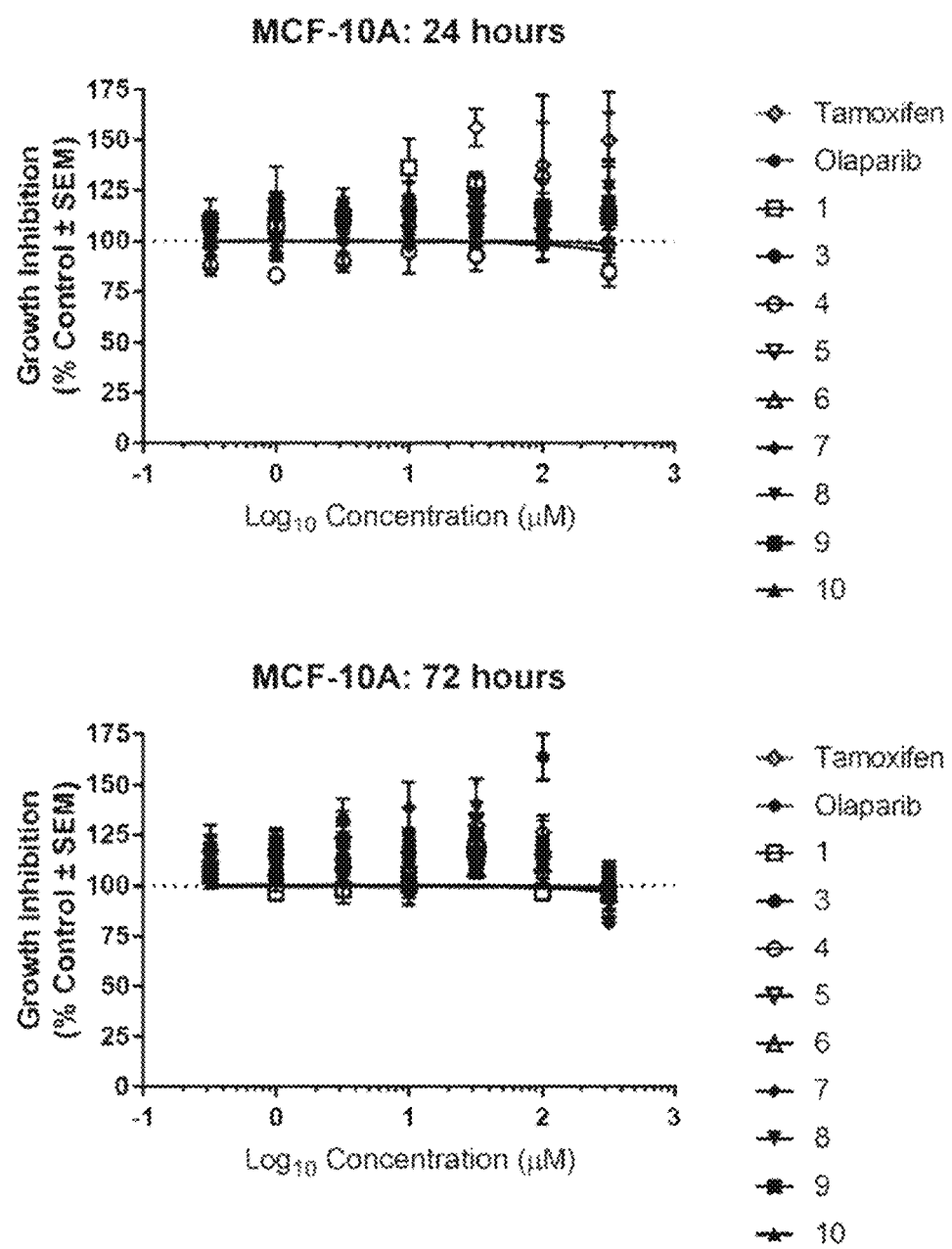
FIG. 14 shows graphs illustrating dose-response (0.32-20 µM) of tamoxifen, olaparib, and compounds 1 and 3-10 on the inhibition of growth of noncancerous MCF-10A breast cells at 24 h (top) and 72 h (bottom) from treatment.
Figure 15:
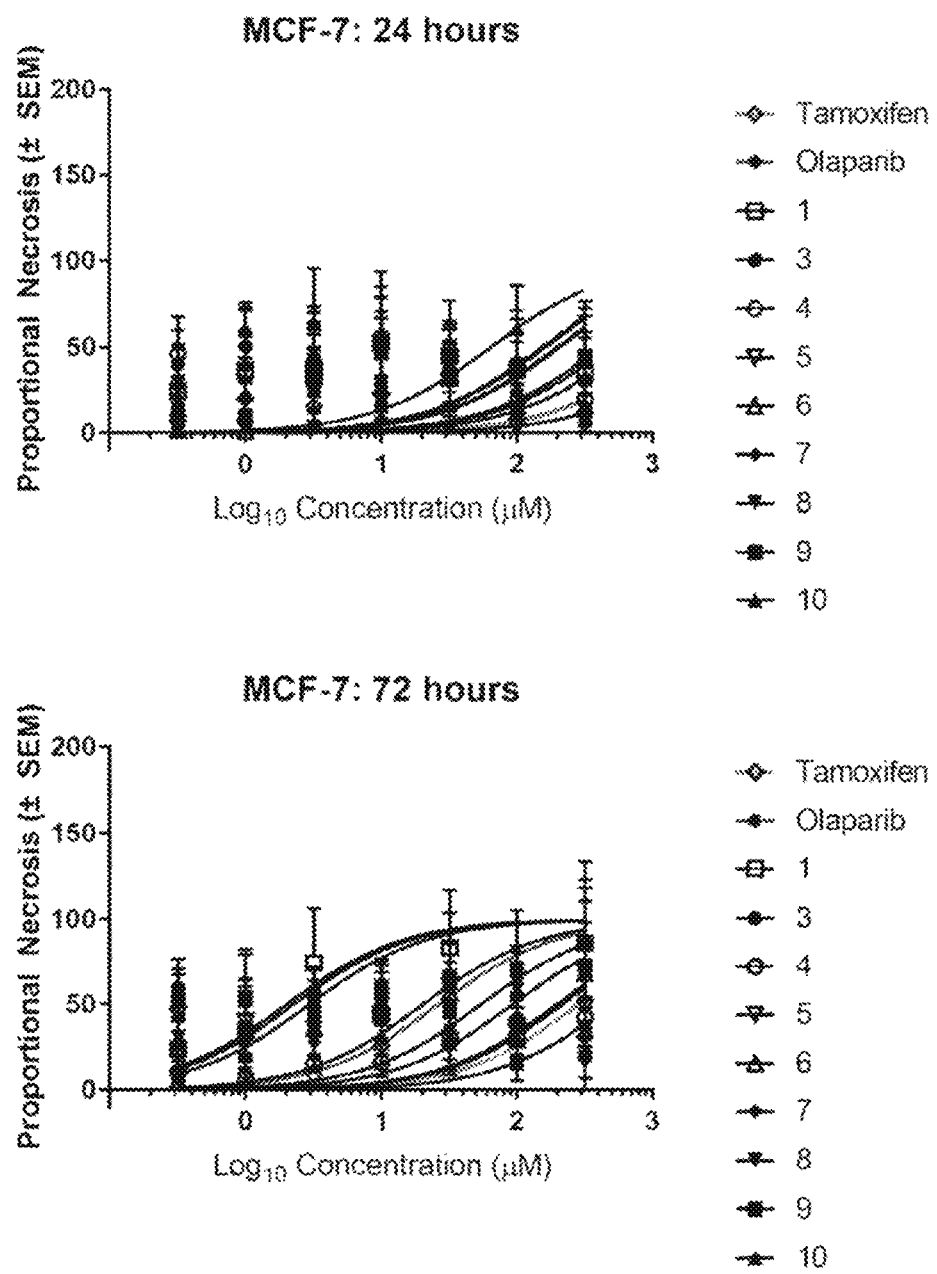
FIG. 15 shows graphs illustrating dose-response (0.32-20 µM) of tamoxifen, olaparib, and compounds 1 and 3-10 on the cell death of MCF-7 breast cancer cells at 24 h (top) and 72 h (bottom) from treatment.
Figure 16:
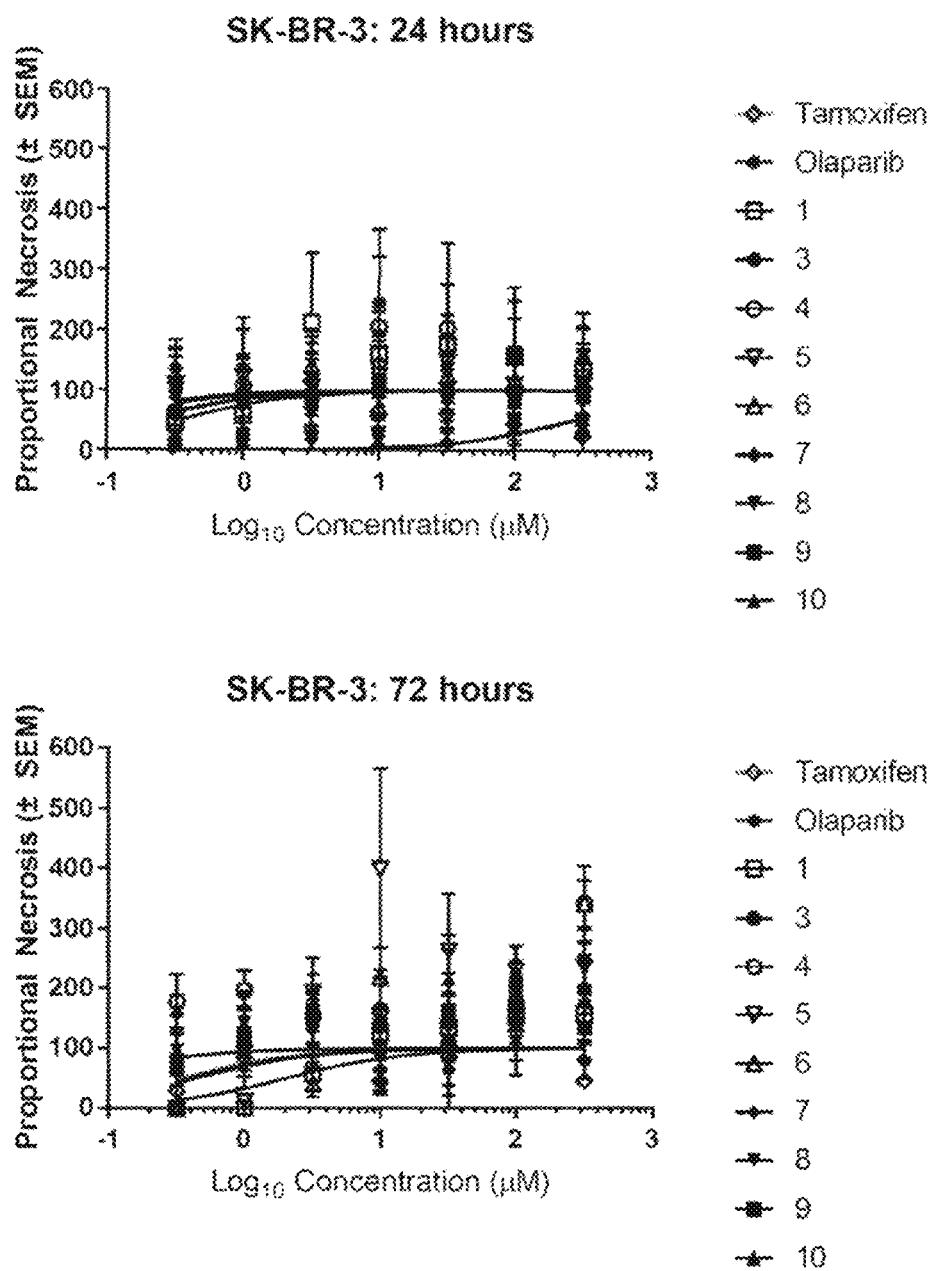
FIG. 16 shows graphs illustrating dose-response (0.32-20 µM) of tamoxifen, olaparib, and compounds 1 and 3-10 on the cell death of SK-BR-3 breast cancer cells at 24 h (top) and 72 h (bottom) from treatment.
Figure 17:
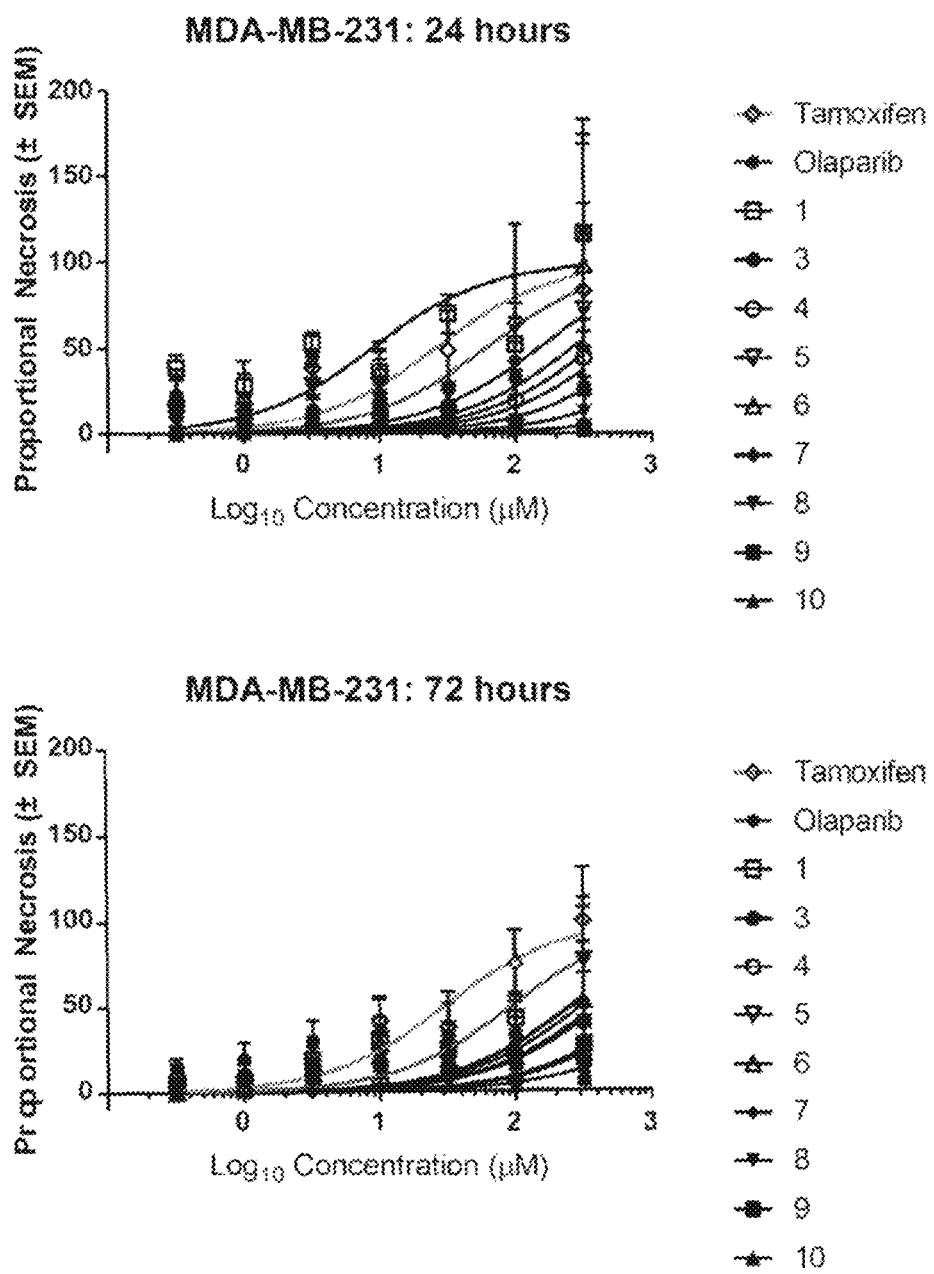
FIG. 17 shows graphs illustrating dose-response (0.32-20 µM) of tamoxifen, olaparib, and compounds 1 and 3-10 on the cell death of triple-negative MDA-MB-231 breast cancer cells at 24 h (top) and 72 h (bottom) from treatment.
Figure 18:
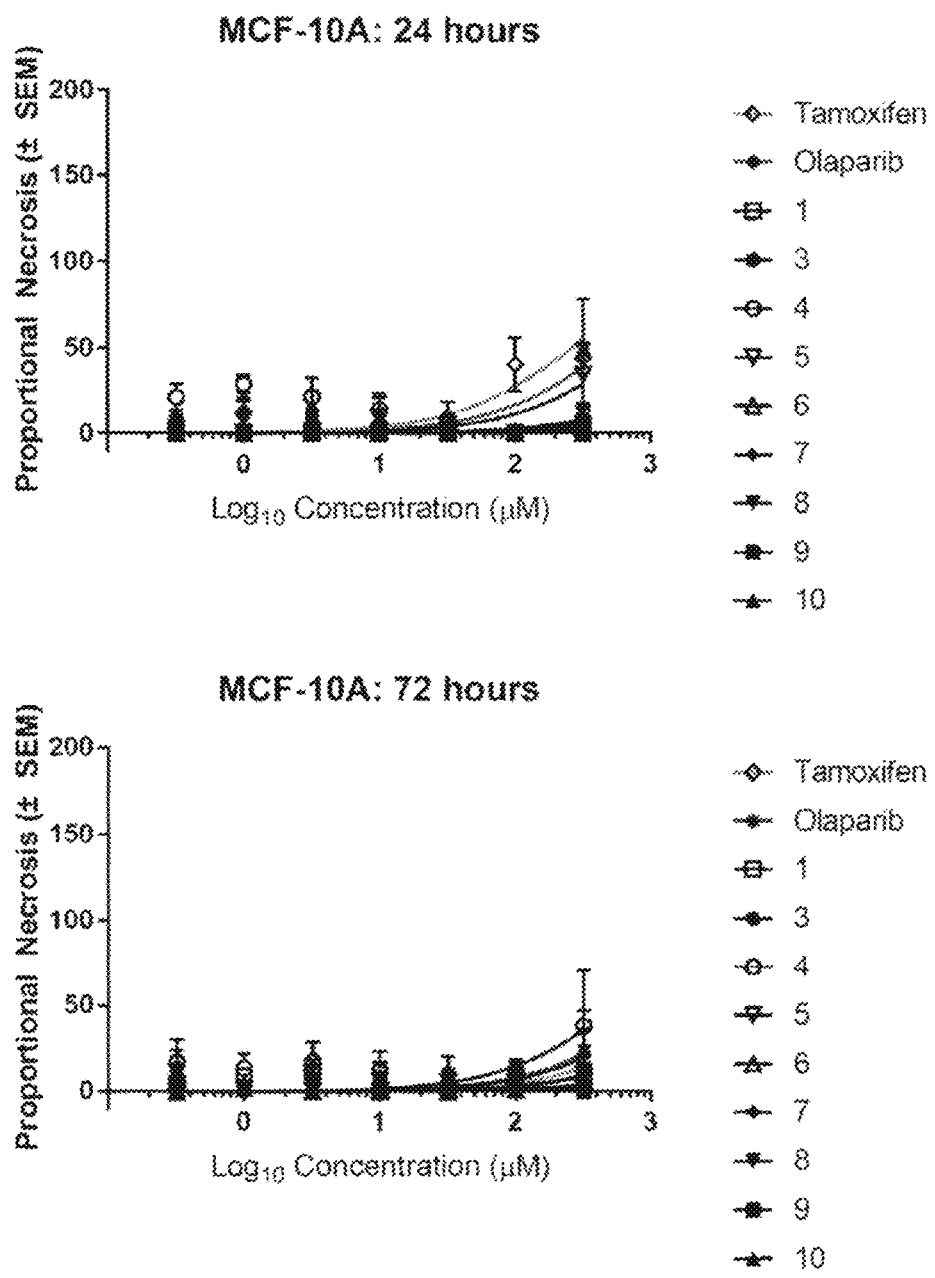
FIG. 18 shows graphs illustrating dose-response (0.32-20 µM) of tamoxifen, olaparib, and compounds 1 and 3-10 on the cell death of noncancerous MCF-10A breast cells at 24 h (top) and 72 h (bottom) from treatment.

Without wishing to be bound by theory, it is believed that the cyclization of 28 and 29 upon deprotection in acidic conditions was due to the electron withdrawing effect of the substituted phenyl groups. To test its cyclization in a neutral deprotection condition, it was decided to make the corresponding protected amide with 3,5-dichloroaniline (31, FIG. 8). However, only the cyclized product 30 was obtained. The desired amide 31 was detected in trace amount and observed to be very unstable. It is very likely that 31 was formed from the coupling reaction, but then quickly underwent cyclization, even in the coupling reaction condition. Several other coupling reaction conditions were then tried with different amide coupling reagents, including HATU, EDC, HOBt. The same result was observed with 30 being the major product and 31 being detected only in trace amounts.

Evaluation of L-γ-Methyleneglutamine and its Amide Derivatives for their Anticancer Activity In order to assess their capacity for inhibition of tumor growth, compounds 1 and 3-10 were screened for 24 h or 72 h growth of MCF-7 ($ER^+/PR^+/HER2^-$), SK-BR-3 ($ER^-/PR^-/HER2^+$), and MDA-MB-231 (triple negative) breast cancer cell lines. Compound efficacy was then compared to those of tamoxifen and olaparib. Tamoxifen was chosen because it was shown to suppress the proliferation of estrogen receptor-negative cells through inhibition of glutamine uptake. Olaparib was chosen because it is one of a few FDA-approved chemotherapeutics for triple-negative breast cancer.

When assessed against MCF-7 cells, tamoxifen demonstrated greater short-term potency than olaparib, but both tamoxifen and olaparib exerted $IC_{50}$'s between 41 and 108 µM by 72 h of exposure (Table 1, FIG. 9). In the short-term, all compounds (with the exceptions of 3 and 4) were as potent as tamoxifen at inhibiting MCF-7 growth. By 72 h, significant differences in potency were not observed with the exceptions of compounds 7 and 8 which were significantly less potent than tamoxifen.

For all controls and compounds, growth inhibition was greater when assessed against $HER^+SK$-BR-3 cells compared to other cancer lines. After 24 h, all compounds except 7 were as efficacious as olaparib and all compounds except 7 and 10 were as potent as tamoxifen (Table 1, FIG. 9). However, by 72 h hours all compounds exerted potency commensurate to either positive control.

As expected, the triple-negative MDA-MB-231 cell line provoked the greatest variance in compound potency (Table 1, FIG. 9). After 24 h, only compounds 1 and 6 exerted potency that was commensurate to tamoxifen. Compounds 8 and 10 demonstrated poorer potency than both tamoxifen or olaparib. After 72 h, all compounds demonstrated reduced potency compared to tamoxifen, and compounds 3, 4, 7, 8, and 10 exerted poorer potency than olaparib. As such, 1 and 6 were notable for their short-term performance that was commensurate to tamoxifen while retaining longer-term performance commensurate to olaparib. Compounds 5 and 9 performed equipotent to olaparib throughout testing. Importantly, no treatment significantly inhibited the growth of non-cancerous, MCF-10A, breast cells at micromolar concentrations (Table 1, FIG. 9), supporting the anti-carcinogenic selectivity of these effects.

TABLE 1

Concentrations that produced half-maximal inhibition of cell growth ($IC_{50}$) after 24 h or 72 h exposure to a dose-response regimen (0.32-320 μM) of compounds 1, 3-10, or positive controls (tamoxifen or olaparib). Lesser $IC_{50}$ indicates increased potency. * significantly different from tamoxifen. ^ significantly different from olaparib.

| | Growth Inhibition IC50 (μM) | | | | | | | |
|---|---|---|---|---|---|---|---|---|
| | MCF-7 | | SK-BR-3 | | MDA-MB-231 | | MCF-10A | |
| | 24 h | 72 h | 24 h | 72 h | 24 h | 72 h | 24 h | 72 h |
| Tamoxifen | 288.7 | 41.3 | 0.9 | 1.7 | 53.0 | 41.2 | >1000 | >1000 |
| Olaparib | >1000 | 107.8 | 1.6 | 1.1 | 160.7 | 154.4 | >1000 | >1000 |
| 1 | 459.3 | 609.3 | 7.9 | 11.3 | 141.1 | 585.2* | >1000 | >1000 |
| 3 | >1000 | 250.5 | 36.9 | 1.7 | 776.6* | 813.8*^ | >1000 | >1000 |
| 4 | >1000 | 196.6 | 74.2 | 0.6 | 480.9* | 649.4*^ | >1000 | >1000 |
| 5 | 589.8 | 85.33 | 3.9 | 4.5 | 350.0* | 339.0* | >1000 | >1000 |
| 6 | 457.1 | 534.1 | 12.8 | 3.2 | 216.4 | 367.6* | >1000 | >1000 |
| 7 | 231.2 | 416.4* | 313.6*^ | 0.6 | 648.6* | 921.5*^ | >1000 | >1000 |
| 8 | 433.7 | 605.5* | 133.4 | 0.6 | 684.7*^ | 812.8*^ | >1000 | >1000 |
| 9 | 414.1 | 76.0 | 11.4 | 4.7 | 651.7* | 419.3* | >1000 | >1000 |
| 10 | 396.9† | 170.7 | 78.7* | 4.0 | 867.4*^ | 712.1*^ | >1000 | >1000 |

Evaluation of L-γ-Methyleneglutamine and its Amide Derivatives for their Cytotoxic Activity To assess whether cytotoxicity contributed to reductions in cell growth, positive controls and compounds were screened for cytotoxicity following independent observations at 24 h or 72 h using the necrosis indicator propidium iodide.

Following 24 h exposure, neither tamoxifen nor olaparib were cytotoxic to MCF-7 cells; however, a micromolar $EC_{50}$ for cytotoxicity was apparent by 72 h (Table 2, FIG. 10). With the exception of 5, all compounds demonstrated micromolar toxicity, with 7 notably demonstrating an $EC_{50}$ of 64 μM at 24 h. After 72 h, the $EC_{50}$ for MCF-7 cytotoxicity was lower for all compounds except 8 (which did not change). Compounds 1 and 9 notably exerted $EC_{50}$'s significantly lower than tamoxifen.

Similar to observations using MCF-7 cells, neither tamoxifen nor olaparib were cytotoxic to SK-BR-3 cells until 72 h of exposure (Table 2, FIG. 10). However, when cytotoxicity was observed, SK-BR-3 cells appeared more sensitive. At 24 h, only 5 was devoid of toxicity, but cell death was apparent by 72 h. Compounds 1, 6, and 9, exerted commensurate $EC_{50}$'s at 24 or 72 h, but 3, 4, 7, 8, and 10 demonstrated much reduced toxicity after the first 24 h. By 72 h, these latter compounds all demonstrated $EC_{50}$'s beyond the micromolar range.

Among triple-negative MDA-MB-231 cells, tamoxifen and olaparib demonstrated cytotoxic $EC_{50}$'s that were equal to, or lesser than, 100 μM at 24 or 72 h (Table 2, FIG. 10). At 24 h, compounds 3, 4, and 7-10 exerted $EC_{50}$'s significantly greater than tamoxifen with 8-10 also significantly greater than olaparib. Moreover, at 72 h, all compounds demonstrated less cytotoxicity than either positive control with all $EC_{50}$'s significantly differing from tamoxifen and 4, 7, 8, and 10 significantly differing from olaparib.

To assess the selectivity of cytotoxicity for cancer cells, all drugs and compounds were screened against MCF-10A, non-cancerous breast cells. Within the first 24 h, tamoxifen and olaparib demonstrated $EC_{50}$'s between 268 and 511 μM, whereas no compound exerted an $EC_{50}$ below the millimolar range except 5 (Table 2, FIG. 10). Little cell death was observed after the first 24 h with only 4 demonstrating an $EC_{50}$ in the micromolar range, supporting the carcinogenic selectivity of cytotoxic effects.

TABLE 2

Concentrations that produced half-maximal effect for cell death ($EC_{50}$) after 24 h or 72 h exposure to a dose-response regimen (0.32-320 μM) of compounds 1, 3-10, or positive controls (tamoxifen or olaparib). Lesser $EC_{50}$ indicates increased cytotoxicity. * indicates significantly different from tamoxifen. ^ indicates significantly different from olaparib.

| | Cytotoxicity EC50 (μM) | | | | | | | |
|---|---|---|---|---|---|---|---|---|
| | MCF-7 | | SK-BR-3 | | MDA-MB-231 | | MCF-10A | |
| | 24 h | 72 h | 24 h | 72 h | 24 h | 72 h | 24 h | 24 h |
| Tamoxifen | >1000 | 285.1 | >1000 | 0.3 | 26.0 | 30.9 | 267.6 | >1000 |
| Olaparib | >1000 | 26.5 | >1000 | 0.1 | 61.2 | 97.1 | 510.8 | >1000 |
| 1 | 152.1 | 3.0* | 0.2 | 2.0 | 8.9 | 319.8* | >1000 | >1000 |
| 3 | 421.1 | 2.0 | 0.2 | >1000 | 541.3* | 409.1* | >1000*^ | >1000 |
| 4 | 664.2 | 217.6 | 0.1 | >1000 | 374.2* | 979.8*^ | >1000* | 562.9 |
| 5 | >1000 | 54.5 | >1000 | 0.4 | 264.7 | 261.8* | 795.6 | >1000 |
| 6 | 484.6 | 20.4 | 0.3 | 0.4 | 149.8 | 270.2* | >1000*^ | >1000*^ |
| 7 | 64.1 | 507.6 | 272.4 | >1000 | 933.1* | >1000*^ | >1000* | >1000 |
| 8 | 196.7 | 198.1 | 0.1 | >1000 | >1000*^ | >1000*^ | >1000*^ | >1000 |

TABLE 2-continued

Concentrations that produced half-maximal effect for cell death (EC$_{50}$) after 24 h or 72 h exposure to a dose-response regimen (0.32-320 µM) of compounds 1, 3-10, or positive controls (tamoxifen or olaparib). Lesser EC$_{50}$ indicates increased cytotoxicity. * indicates significantly different from tamoxifen. ^ indicates significantly different from olaparib.

| | Cytotoxicity EC50 (VW | | | | | | | |
|---|---|---|---|---|---|---|---|---|
| | MCF-7 | | SK-BR-3 | | MDA-MB-231 | | MCF-10A | |
| | 24 h | 72 h | 24 h | 72 h | 24 h | 72 h | 24 h | 24 h |
| 9 | 160.7 | 2.3* | 0.2 | 0.1 | >1000*^ | 449.8* | >1000*^ | >1000 |
| 10 | 205.1 | 93.2 | 262.0 | >1000 | >1000*^ | >1000*^ | >1000*^ | >1000 |

Conclusion

For the first time an efficient synthetic route to the biological relevant L-γ-methyleneglutamine (1) and its amide derivatives (3-10) is reported. These compounds were evaluated for their anticancer activity on three different breast cancer cell lines: MCF-7 (ER$^+$/PR$^+$/HER2$^-$), SK-BR-3 (ER$^-$/PR$^-$/HER2$^+$), and triple negative MDA-MB-231. The compounds were also evaluated for their activity on non-cancerous cell line MCF10A as a control. The results showed that many of these compounds were as efficacious as tamoxifen or olaparib at arresting cell growth among MCF-7 cells and SK-BR-3 cells at 24 or 72 h post treatment. Notably, compounds 1 and 6 were as efficacious as olaparib at arresting cell growth among triple-negative MDA-MB-231 cells at 72 h, and were cytotoxic to the triple-negative cells, but not to non-cancerous control cells. As such, the inhibition of cancer cell growth produced by these compounds may involve cytotoxicity, but their specific mechanism(s) of action require further investigation. FIGS. 11-18 shows graphs illustrating dose-response of compounds of the presently claimed invention.

Example 2

This Example describes the general chemical synthesis procedures for various compounds disclosed herein.

All chemicals were obtained from Sigma-Aldrich or Fisher Scientific and used as received unless specified. All syntheses were conducted with anhydrous conditions under an atmosphere of argon, using flame-dried glassware and employing standard techniques for handling air-sensitive materials unless otherwise noted. All solvents were distilled and stored under an argon or nitrogen atmosphere before use. $^1$H NMR and $^{13}$C NMR spectra were recorded on a Bruker-400 and or a Bruker-500 spectrometer using CDCl$_3$, MeOD, or D$_2$O as the solvent. Chemical shifts (δ) were recorded in parts per million and referenced to CDCl$_3$ (7.26 ppm for $^1$H NMR and 77.16 ppm for $^{13}$C NMR), MeOD (3.31 ppm for $^1$H NMR and 49.00 ppm for $^{13}$C NMR), or D$_2$O (4.79 ppm for $^1$H NMR). Coupling constants (J) are in Hz. The following abbreviations were used to designate the multiplicities: s=singlet, d=doublet, t=triplet, q=quartet, quint=quintuplet, m=multiplet, br=broad. LC-MS were measured with an ACQUITY-Waters micromass (ESCi) system. High-resolution mass spectra (HRMS) were measured with a Synapt Q-TOF ESI-MS.

Synthetic Procedures tert-Butyl (S)-5-oxopyrrolidine-2-carboxylate (16)

To the suspension of L-pyroglutamic acid (10 g, 77.5 mmol) (12) and tert-butyl acetate (100 mL) were added 70% HClO$_4$ (2.3 mL). The suspension was stirred overnight at rt. Diethyl ether was added to the clear reaction mixture followed by slow addition of saturated solution of sodium bicarbonate to neutralize the acid. The reaction mixture was extracted twice with diethyl ether, dried over sodium sulfate and evaporated in vacuo to afford compound 16 (9.54 g, 67% yield) as a viscous liquid.

$^1$H NMR (400 MHz, CDCl$_3$) δ 6.79 (s, 1H), 4.05 (td, J=8.9, 8.4, 4.6 Hz, 1H), 2.29 (qt, J=17.4, 6.6 Hz, 3H), 2.17-1.94 (m, 1H), 1.53-1.23 (m, 9H); $^{13}$C NMR (101 MHz, CDCl$_3$) δ 178.1, 171.1, 82.2, 56.1, 29.4, 27.9, 27.9, 24.8.

Di-tert-butyl (S)-5-oxopyrrolidine-1,2-dicarboxylate (17)

Compound 16 (9.54 g, 51.4 mmol) was dissolved in 150 mL of anhydrous dichloromethane under argon atmosphere. 4-(Dimethylamino)pyridine (6.9 g, 56.5 mmol), (Boc)$_2$O (12.3 g, 56.5 mmol), and Et$_3$N (5.7 g, 56.5 mmol) were added to the reaction mixture and stirred for overnight at rt. Water (200 mL) was added to the reaction flask, and the mixture was extracted twice with ethyl acetate. The solvents were evaporated in vacuo. The crude compound was purified by silica column chromatography (33% ethyl acetate in hexane) to afford 17 (14.6 g, 91% yield) as a light-yellow viscous liquid.

$^1$H NMR (400 MHz, CDCl$_3$) δ 4.40 (dd, J=9.4, 2.6 Hz, 1H), 2.52 (ddd, J=17.6, 10.6, 9.5 Hz, 1H), 2.38 (ddd, J=17.5, 9.4, 3.2 Hz, 1H), 2.22 (ddt, J=13.5, 10.8, 9.4 Hz, 1H), 1.92 (dtt, J=15.8, 6.0, 3.3 Hz, 1H), 1.41 (d, J=7.1 Hz, 18H); $^{13}$C NMR (101 MHz, CDCl$_3$) δ 173.4, 170.1, 149.0, 83.0, 82.0, 59.3, 30.9, 27.7, 27.7, 21.4.

Di-tert-butyl-(S)-4-methylene-5-oxopyrrolidine-1,2-dicarboxylate (18)

Compound 17 (3.0 g, 10.5 mmol) was dissolved in anhydrous THF (10 mL) under argon and cooled to −78° C. LHMDS 1 M solution in THF (25 mL) was added to the reaction mixture slowly. The reaction was stirred for 30 min at −78° C. and then added 2,2,2-trifluoroethyl 2,2,2-trifluoroacetate (2.47 g, 12.6 mmol). The reaction mixture was stirred at −78° C. for 1.5 h then quenched with saturated NH$_4$Cl solution. The crude mixture was extracted twice with dichloromethane. The organic layer was dried over sodium sulfate and evaporated in vacuo. The crude intermediate mixture was used for the next step without further purification.

The crude intermediate mixture was dissolved in anhydrous benzene (80 mL) and was added K$_2$CO$_3$ (3.97 g, 28.75 mmol), paraformaldehyde (3.5 g), and 18-crown-6 (414 mg, 1.57 mmol) under argon condition. The reaction mixture was heated at 60° C. for 2 hours until the reaction was complete. The solids were filtered off and the solvents were evaporated. The crude mixture was purified using silica column (33% ethyl acetate in hexane) to afford 18 (2.08 g, 66% yield) as a viscous colorless gel.

$^1$H NMR (400 MHz, CDCl$_3$) δ 6.16 (d, J=2.9 Hz, 1H), 5.45 (t, J=2.5 Hz, 1H), 4.43 (dd, J=10.0, 3.1 Hz, 1H), 2.99 (ddt, J=17.5, 10.1, 3.0 Hz, 1H), 2.69-2.53 (m, 1H), 1.44 (d, J=25.6 Hz, 18H); $^{13}$C NMR (101 MHz, CDCl$_3$) δ 169.9, 165.5, 149.8, 136.8, 120.4, 83.4, 82.3, 56.3, 27.9, 27.9, 27.8; HRMS: m/z calcd for C$_{15}$H$_{23}$NO$_5$Cs [M+Cs] 430.0630; found 430.0623.

(S)-5-(tert-butoxy)-4-((tert-butoxycarbonyl) amino)-2-methylene-5-oxopentanoic acid (19)

Compound 18 (782 mg, 2.6 mmol) was dissolved in THF (30 mL) and added LiOH (124.5 mg, 5.2 mmol) at rt. The reaction mixture was stirred overnight at ambient temperature. After completion, the reaction mixture was passed through a short silica column and washed with 20% MeOH in DCM to afford 19 (700 mg, 70% yield) as a white solid.

$^1$H NMR (400 MHz, MeOD) δ 6.23 (s, 1H), 5.68 (s, 1H), 4.24 (dd, J=9.3, 6.1 Hz, 1H), 2.77 (dd, J=13.8, 5.9 Hz, 1H), 2.61-2.42 (m, 1H), 1.44 (d, J=10.7 Hz, 18H); $^{13}$C NMR (101 MHz, MeOD) δ 173.1, 169.9, 157.9, 138.3, 128.9, 82.9, 80.5, 55.0, 35.6, 28.8, 28.7, 28.4; LC-MS (ESI) m/z calcd for C$_{15}$H$_{26}$N$_2$O$_6$ [M+H]=316.2; found 316.2.

General Procedure for Amide Coupling:

To a solution of the acid compound (1 equiv) in anhydrous THF in argon condition was added HBTU (1.5 equiv), Et$_3$N (1.5 equiv), 4-methylmorpholin (1.5 equiv), and amine (1.5 equiv) at rt. The reaction mixture was stirred for 3 hours at rt. The solid was filtered off, and the filtrate was concentrated. The crude mixture was purified via silica column (ethyl acetate and hexane) to afford the amides.

tert-butyl (S)-2-((tert-butoxycarbonyl) amino)-4-carbamoylpent-4-enoate (20)

Compound 20 was synthesized via the general amide coupling procedure where 4 equivalent of ammonium chloride was used in place of amine. Yield 85%, white solid.

$^1$H NMR (400 MHz, CDCl$_3$) δ 5.86 (s, 1H), 5.51 (s, 1H), 4.14 (dt, J=10.7, 5.4 Hz, 1H), 2.81 (m, 1H), 2.57 (dd, J=14.0, 8.8 Hz, 1H), 1.45 (d, J=13.0 Hz, 18H); $^{13}$C NMR (101 MHz, CDCl$_3$+MeOD) δ 173.0, 172.9, 157.9, 141.5, 123.2, 83.0, 80.6, 55.2, 39.0, 28.8, 28.4; LC-MS (ESI) m/z calcd for C$_{15}$H$_{27}$N$_2$O$_5$ [M+H]=315.2; found 315.2.

General Method for Deprotection of Amide Compounds:

tert-Butyl and Boc protected amides were dissolved in a DCM:TFA=4:1 mixture at rt and stirred until all the starting material was fully consumed. After the reaction was complete, the solvents were evaporated. The crude mixture was purified via silica gel column chromatography (DCM and MeOH) or HPLC (H$_2$O and ACN).

(S)-2-amino-4-carbamoylpent-4-enoic acid (1)

Compound 1 was prepared from 20 by following the general deprotection procedure. Yield 80%, white solid.

$^1$H NMR (400 MHz, DMSO+D$_2$O) δ 5.82 (s, 1H), 5.58 (s, 1H), 3.67-3.57 (m, 1H), 2.75 (dd, J=14.7, 4.5 Hz, 1H), 2.59-2.48 (m, 1H); NH$_2$ was not observed in DMSO+D$_2$O mixture. $^{13}$C NMR (101 MHz, DMSO+D$_2$O) δ 171.9, 138.0, 125.2, 53.6, 33.6; LC-MS (ESI) m/z calcd for C$_6$H$_{11}$N$_2$O$_3$ [M+H]=159.1; found 159.1.

tert-butyl(S)-2-((tert-butoxycarbonyl) amino)-4-(phenylcarbamoyl) pent-4-enoate (22)

Compound 22 (70 mg, 43% yield) was synthesized from the intermediate 19 and aniline by following the general amide coupling procedure.

$^1$H NMR (400 MHz, MeOD) δ 7.59 (d, J=8.0 Hz, 2H), 7.37-7.26 (m, 2H), 7.17-7.06 (m, 1H), 5.89 (s, 1H), 5.58 (s, 1H), 4.19 (dd, J=8.6, 5.2 Hz, 1H), 2.89 (dd, J=14.0, 5.5 Hz, 1H), 2.68 (dd, J=14.1, 8.9 Hz, 1H), 1.43 (d, J=19.5 Hz, 18H); $^{13}$C NMR (101 MHz, CDCl$_3$) δ 170.5, 166.5, 155.8, 141.4, 138.3, 128.8, 124.2, 122.2, 120.1, 82.7, 80.2, 53.5, 36.8, 28.3, 28.0, 28.0; LC-MS (ESI) m/z calcd for C$_{21}$H$_{31}$N$_2$O$_5$ [M+H]=391.2; found 391.2.

(S)-2-amino-4-(phenylcarbamoyl) pent-4-enoic acid (3)

Compound 3 (24 mg, 55% yield as a white solid) was synthesized from 22 by following the general deprotection procedure.

$^1$H NMR (400 MHz, CH$_3$CN+D$_2$O) δ δ 7.59 (d, J=8.0 Hz, 2H), 7.37-7.26 (m, 2H), 7.17-7.06 (m, 1H), 5.89 (s, 1H), 5.58 (s, 1H), 4.19 (dd, J=8.6, 5.2 Hz, 1H), 2.89 (dd, J=14.0, 5.5 Hz, 1H), 2.68 (dd, J=14.1, 8.9 Hz, 1H), 1.43 (d, J=19.5 Hz, 20H); $^{13}$C NMR (126 MHz, CH$_3$CN+D$_2$O) δ 172.7, 169.1, 139.45, 139.4, 137.6, 129.1, 125.2, 124.9, 121.6, 54.4, 33.8; LC-MS (ESI) m/z calcd for C$_{12}$H$_{15}$N$_2$O$_3$ [M+H]=235.1; found 235.1.

tert-butyl (S)-4-(benzylcarbamoyl)-2-((tert-butoxycarbonyl) amino) pent-4-enoateenoate (23)

Compound 23 was prepared from the intermediate 19 and the benxylamine by following the general amide coupling procedure. Yield 70%, sticky gel.

$^1$H NMR (400 MHz, CDCl$_3$) δ 7.41-7.18 (m, 5H), 7.00 (s, 1H), 5.73 (s, 1H), 5.59 (d, J=7.7 Hz, 1H), 5.36 (s, 1H), 4.47 (d, J=5.7 Hz, 2H), 4.19 (q, J=6.8 Hz, 1H), 2.78 (dd, J=14.1, 5.8 Hz, 1H), 2.62 (dd, J=14.0, 7.6 Hz, 1H), 1.41 (d, J=13.2 Hz, 18H); $^{13}$C NMR (101 MHz, CDCl$_3$) δ 170.7, 168.0, 155.4, 140.5, 138.0, 128.6, 127.6, 127.2, 121.3, 82.0, 79.5, 53.7, 43.6, 35.5, 28.1, 27.8; HRMS m/z calcd for C$_{22}$H$_{32}$N$_2$O$_5$Cs [M+Cs] 537.1365; found 537.1371.

(S)-2-amino-4-(benzylcarbamoyl) pent-4-enoic acid (4)

Compound 4 was prepared from 23 using the general deprotection method. Yield 93%, white solid.

$^1$H NMR (500 MHz, MeOD) δ 7.44-7.23 (m, 5H), 5.89 (s, 1H), 5.68 (s, 1H), 4.44 (s, 2H), 2.90 (dd, J=15.0, 4.7 Hz, 1H), 2.77 (q, J=7.5 Hz, 1H); $^{13}$C NMR (126 MHz, MeOD) δ 172.8, 170.6, 138.7, 137.9, 128.7, 127.4, 127.2, 124.2, 54.2, 43.2, 33.7; HRMS m/z calcd for C$_{13}$H$_{15}$N$_2$O$_3$ [M−H] 247.1083; found [M−H] 247.1073.

tert-butyl(S)-2-((tert-butoxycarbonyl) amino)-4-((4-fluorobenzyl) carbamoyl) pent-4-enoate (24)

Compound 24 was synthesized from intermediate 19 and p-fluorobenzylamine by following the general amide coupling procedure. Yield 76%, sticky gel.

¹H NMR (400 MHz, CDCl₃) δ 7.36-7.18 (m, 2H), 7.13 (d, J=5.9 Hz, 1H), 7.03-6.90 (m, 2H), 5.77 (s, 1H), 5.54 (d, J=7.6 Hz, 1H), 5.36 (s, 1H), 4.44 (d, J=5.8 Hz, 2H), 4.17 (d, J=6.9 Hz, 1H), 2.78 (dd, J=14.1, 6.1 Hz, 1H), 2.61 (dd, J=13.9, 7.2 Hz, 1H), 1.41 (d, J=15.2 Hz, 18H); ¹³C NMR (101 MHz, CDCl₃) δ 170.4, 168.0, 163.2, 160.8, 155.6, 140.4, 134.0, 134.0, 129.5, 129.4, 121.9, 115.4, 115.2, 82.3, 79.8, 60.3, 53.7, 43.0, 35.9, 28.23, 27.9; LC-MS (ESI) m/z calcd for $C_{22}H_{32}FN_2O_5$ [M+H] 423.2; found 423.2.

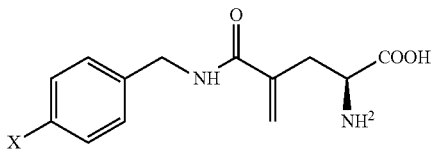

(S)-2-amino-4-((4-fluorobenzyl)carbamoyl)pent-4-enoic acid (5)

Compound 5 was prepared from 24 using the general deprotection method.

¹H NMR (400 MHz, DMSO-d₆) δ 9.01 (s, 1H), 7.32 (t, J=7.0 Hz, 2H), 7.21-7.07 (m, 2H), 5.82 (s, 1H), 5.52 (s, 1H), 4.32 (d, J=5.8 Hz, 2H), 3.37 (dd, J=8.7, 4.4 Hz, 1H), 2.84 (dt, J=14.6, 3.2 Hz, 1H), 2.50-2.43 (m, 1H); ¹³C NMR (101 MHz, DMSO-d₆) δ 167.9, 162.3, 159.9, 140.2, 135.6, 129.2, 129.1, 121.8, 114.9, 114.7, 53.4, 41.7, 34.5; HRMS m/z calcd for $C_{13}H_{14}FN_2O_3$ [M−H] 265.0988; found 265.0964.

tert-butyl (S)-2-((tert-butoxycarbonyl) amino)-4-((4-nitrobenzyl) carbamoyl) pent-4-enoate (25)

Compound 25 was prepared from the intermediate 19 and p-nitrobenzylamine by following the general amide coupling procedure. This compound was partially purified and used for next general deprotection step.

(S)-2-amino-4-((4-nitrobenzyl) carbamoyl) pent-4-enoic acid (6)

Compound 6 was prepared from 25 using the general deprotection method. 50 mg, 91% white solid.

¹H NMR (400 MHz, DMSO-d₆) δ 9.26 (d, J=6.0 Hz, 1H), 8.17 (d, J=8.4 Hz, 2H), 7.56 (d, J=8.3 Hz, 2H), 5.85 (s, 1H), 5.54 (s, 1H), 4.46 (d, J=6.0 Hz, 2H), 3.71-3.01 (m, 4H), 2.83 (dd, J=14.7, 4.7 Hz, 1H); ¹³C NMR (101 MHz, DMSO-d₆) δ 169.9, 168.5, 148.1, 146.8, 140.6, 128.6, 123.8, 122.5, 53.8, 42.5, 34.9. HRMS m/z calcd for $C_{13}H_{16}N_3O_5$ [M+H] 294.1012; found 294.1020.

tert-butyl (S)-2-((tert-butoxycarbonyl) amino)-4-(cyclopropylcarbamoyl) pent-4-enoate (26)

Compound 26 was synthesized from intermediate 19 and cyclopropylamine by following the general amide coupling method. Yield 76%, sticky gel.

¹H NMR (400 MHz, CDCl₃) δ 6.78 (s, 1H), 5.71 (s, 1H), 5.47 (d, J=7.4 Hz, 1H), 5.30 (s, 1H), 4.11 (d, J=7.0 Hz, 1H), 2.85-2.66 (m, 2H), 2.58 (dd, J=14.1, 7.2 Hz, 1H), 1.41 (d, J=7.7 Hz, 16H), 0.85-0.70 (m, 1H), 0.66-0.42 (m, 2H); ¹³C NMR (101 MHz, CDCl₃) δ 170.7, 169.4, 155.6, 140.5, 121.6, 82.3, 79.8, 53.7, 35.8, 28.2, 27.9, 22.9, 6.3; HRMS calcd for $C_{18}H_{30}N_2O_5Cs$ [M+Cs] 487.1209; found 487.1215.

(S)-2-amino-4-(cyclopropylcarbamoyl) pent-4-enoic acid (7)

Compound 7 was prepared from 26 using the general deprotection method. Yield 95%, white solid.

¹H NMR (500 MHz, D₂O+MeOD) δ 5.71 (s, 1H), 5.58 (s, 1H), 3.73-3.62 (m, 1H), 3.23 (s, 1H), 2.79 (dd, J=15.0, 4.2 Hz, 1H), 2.63 (dt, J=16.4, 8.3 Hz, 2H), 0.70 (d, J=6.8 Hz, 2H), 0.56-0.46 (m, 2H); ¹³C NMR (126 MHz, D₂O+MeOD) δ 173.6, 173.6, 140.3, 125.2, 55.9, 35.3, 23.8, 6.7, 6.6; HRMS calcd for m/z $C_9H_{13}N_2O_3$ [M−H] 197.0926; found 197.0921.

tert-butyl (S)-2-((tert-butoxycarbonyl) amino)-4-(piperidine-1-carbonyl) pent-4-enoate (27)

Compound 27 was prepared from intermediate 19 and piperidine by following the general amide coupling method. Yield 93%, sticky gel.

¹H NMR (400 MHz, CDCl₃) δ 5.45 (d, J=8.1 Hz, 1H), 5.20 (s, 1H), 5.06 (s, 1H), 4.17-4.07 (m, 1H), 3.54-3.37 (m, 4H), 2.71 (dd, J=14.5, 5.0 Hz, 1H), 2.59 (dd, J=14.8, 7.6 Hz, 1H), 1.63-1.26 (m, 24H); ¹³C NMR (101 MHz, CDCl₃) δ 170.7, 169.6, 155.2, 139.6, 117.7, 81.5, 79.1, 53.3, 35.9, 28.1, 27.8, 27.7, 24.4; HRMS calcd for $C_{20}H_{34}N_2O_5Cs$ [M+Cs] 515.1522; found 515.1512.

(S)-2-amino-4-(piperidine-1-carbonyl) pent-4-enoic acid (8)

Compound 8 was prepared from 27 using the general deprotection method. Yield 92%, white solid.

¹H NMR (400 MHz, MeOD) δ 5.54 (s, 1H), 5.34 (s, 1H), 3.77 (dd, J=8.8, 4.5 Hz, 1H), 3.69-3.52 (m, 4H), 2.88 (dd, J=14.9, 4.6 Hz, 1H), 2.70 (dd, J=14.9, 8.7 Hz, 1H), 1.80-1.53 (m, 6H); ¹³C NMR (101 MHz, MeOD) δ 172.9, 171.9, 140.0, 121.3, 55.4, 44.1, 36.6, 27.7, 26.7, 25.5; MS calcd for $C_{11}H_{18}N_2O_3Cs$ [M+Cs] 359.0372; found 359.0376.

tert-butyl (S)-2-((tert-butoxycarbonyl) amino)-4-((4-fluorophenyl) carbamoyl) pent-4-enoate (28)

Compound 28 was prepared from intermediate 19 and p-fluoroaniline following the general amide coupling method. This compound was partially purified and used for the next step.

(S)-2-amino-4-((4-fluorophenyl) carbamoyl) pent-4-enoic acid (9)

Crude compound 28 (87 mg) was dissolved in 25 mL of DCM and stirred with ZnBr₂ (12 equiv) overnight. After the reaction was complete, the solvent was concentrated, and the crude product was passed through a silica column, which was then run in gradient with 1% DCM in MeOH to 100% MeOH. The partially purified product from the silica column was further purified by HPLC (7.8×30 mm, 7 μm, C18, gradient 98% water in acetonitrile to 80% water in acetonitrile, flow rate 2 mL/min, retention time 13 min). Yield 13% after HPLC purification.

¹H NMR (400 MHz, D₂O) δ 8.06-7.94 (m, 2H), 7.66-7.55 (m, 2H), 6.43 (s, 1H), 6.21 (s, 1H), 4.25 (dd, J=7.9, 4.4 Hz, 1H), 3.38 (dd, J=14.7, 4.6 Hz, 1H), 3.20 (dd, J=14.8, 8.0 Hz,

1H); $^{13}$C NMR (126 MHz, D$_2$O+CH$_3$CN) δ 172.6, 168.9, 160.6, 158.73, 139.1, 133.7, 133.7, 124.8, 123.6, 123.5, 115.6, 115.4, 54.3, 33.7; LC-MS (ESI) m/z calcd for C$_{12}$H$_{14}$FN$_2$O$_3$ [M+H]=253.1; found 253.1.

tert-butyl (S)-2-((tert-butoxycarbonyl) amino)-4-((4-chlorophenyl) carbamoyl) pent-4-enoate (29)

Compound 29 was prepared from intermediate 19 and p-cloroaniline following the general amide coupling method. This compound was partially purified and used for the next step.

(S)-2-amino-4-((4-chlorophenyl) carbamoyl) pent-4-enoic acid (10)

Compound 10 was prepared and purified by following the same procedure as compound 9. 18 mg, 11% yield after HPLC purification.

$^1$H NMR (400 MHz, D$_2$O) δ 7.91 (d, J=9.1 Hz, 2H), 7.82-7.69 (m, 2H), 6.34 (s, 1H), 6.12 (s, 1H), 4.16 (dd, J=7.8, 4.4 Hz, 1H), 3.29 (dd, J=14.8, 4.7 Hz, 1H), 3.11 (dd, J=15.1, 7.9 Hz, 1H); $^{13}$C NMR (126 MHz, D$_2$O+CH$_3$CN) δ 172.5, 168.8, 138.9, 136.2, 129.2, 128.7, 124.9, 122.7, 54.1, 33.5; LC-MS (ESI) m/z calcd for C$_{12}$H$_{14}$ClN$_2$O$_3$ [M+H] =269.1; found 269.1

Evaluation for the Suppression Activity on the Growth of Cancer Cell Lines

All cell lines were all obtained from the American Type Culture Collection (ATCC; Manassas, VA). Cells were seeded onto 96-well plates at a density of 2×10$^4$ cells/well for assessment of cell death assay. MCF-7, SK-BR-3, and MDA-MB-231 cells were maintained in DMEM/F12 media (#11320-033, Life Technologies, Carlsbad, CA) supplemented with 10% heat-inactivated fetal bovine serum (FBS; #SH30071.03, Thermo Scientific Hyclone, Logan, UT), and 0.5% antibiotic/antimycotic mixture (#15240-062, Life Technologies). MCF-10A cells were maintained in sterile, unfiltered MEBM growth media supplemented with all components of a MEGM kit (#CC-3150, Lonza Group Ltd, Switzerland), with exception of #GA-1000 (gentamycin-amphotericin-B mixture). In addition, 0.5% penicillin-streptomycin mixture (#15-140-163, Thermo Fisher Scientific, Waltham, MA) and Cholera toxin (100 ng/mL; #C8052, Sigma) were added to the media. Cells were incubated with all compounds in a dose-response regimen (0.32, 1, 3.2, 10, 32, 100, 320 µM) for 24 h or 72 h in a 37° C. humidified incubator (5% CO$_2$). On the day of assessment, a working solution of propidium iodide (ex/em: 536/617 nm) and Hoescht 33342 (ex/em: 350/461 nm) was prepared by diluting stocks in Hank's Balanced Salt Solution (HBSS; 1:50 dilution for propidium iodide and 1/10,000 for Hoescht). Media in the 96-well plates was removed and 100 µL of HBSS containing fluorophores was added to each well. Cells were incubated for 15 minutes at 37° C. (5% CO$_2$) and fluorescent emissions were read on a CLARIOstar plate reader (BMG Labtech, Cary, NC). Relative fluorescent units (RFU) for treatment wells were calculated as a proportion of non-treated control wells in order to assess growth. Viability of the cells was assessed by calculating the proportion of necrotic cells as a function of the total cell RFU/well. All experiments were replicated 3 times and each treatment was run in technical duplicate for each experiment.

Statistical Analyses

Median inhibitory and effective doses (IC$_{50}$, EC$_{50}$) were determined via non-linear regression (sigmoidal curvilinear modeling with variable slope) using a least-squares fit for each treatment group (bottom values constrained to 0; Prism 7, GraphPad Software, La Jolla, CA). The IC$_{50}$/EC$_{50}$ values were considered significantly different if the upper and lower 95% confidence interval (CI) between the dose-response curves did not overlap.

While the disclosure is susceptible to various modifications and alternative forms, specific embodiments thereof have been shown by way of example in the drawings and are herein described below in detail. It should be understood, however, that the description of specific embodiments is not intended to limit the disclosure to cover all modifications, equivalents and alternatives falling within the spirit and scope of the disclosure as defined by the appended claims.

REFERENCES (1) Newsholme, P.; Procopio, J.; Lima, M. M. R.; Pithon-Curi, T. C.; Curi, R. Glutamine and Glutamate? Their Central Role in Cell Metabolism and Function. *Cell Biochem. Funct.* 2003, 21 (1), 1-9.

(2) Akins, N. S.; Nielson, T. C.; Le, H. V. Inhibition of Glycolysis and Glutaminolysis: An Emerging Drug Discovery Approach to Combat Cancer. *Curr. Top. Med. Chem.* 2018, 18 (6), 494-504.

(3) Erickson, J. W.; Cerione, R. A. Glutaminase: A Hot Spot for Regulation of Cancer Cell Metabolism? *Oncotarget* 2010, 1 (8), 734-740.

(4) Xiang, Y.; Stine, Z. E.; Xia, J.; Lu, Y.; O'Connor, R. S.; Altman, B. J.; Hsieh, A. L.; Gouw, A. M.; Thomas, A. G.; Gao, P.; Sun, L.; Song, L.; Yan, B.; Slusher, B. S.; Zhuo, J.; Ooi, L. L.; Lee, C. G. L.; Mancuso, A.; McCallion, A. S.; Le, A.; Milone, M. C.; Rayport, S.; Felsher, D. W.; Dang, C. V. Targeted Inhibition of Tumor-Specific Glutaminase Diminishes Cell-Autonomous Tumorigenesis. *J. Clin. Invest.* 2015, 125 (6), 2293-2306.

(5) Hensley, C. T.; Wasti, A. T.; DeBerardinis, R. J. Glutamine and Cancer: Cell Biology, Physiology, and Clinical Opportunities. *J. Clin. Invest.* 2013, 123 (9), 3678-3684.

(6) Shapiro, R. A.; Clark, V. M.; Curthoys, N. P. Inactivation of Rat Renal Phosphate-Dependent Glutaminase with 6-Diazo-5-Oxo-L-Norleucine. Evidence for Interaction at the Glutamine Binding Site. *J. Biol. Chem.* 1979, 254 (8), 2835-2838.

(7) Thangavelu, K.; Pan, C. Q.; Karlberg, T.; Balaji, G.; Uttamchandani, M.; Suresh, V.; Schüler, H.; Low, B. C.; Sivaraman, J. Structural Basis for the Allosteric Inhibitory Mechanism of Human Kidney-Type Glutaminase (KGA) and Its Regulation by Raf-Mek-Erk Signaling in Cancer Cell Metabolism. *Proc. Natl. Acad. Sci. U.S.A.* 2012, 109 (20), 7705-7710.

(8) Thangavelu, K.; Chong, Q. Y.; Low, B. C.; Sivaraman, J. Structural Basis for the Active Site Inhibition Mechanism of Human Kidney-Type Glutaminase (KGA). *Sci. Rep.* 2014, 4, 3827.

(9) Barclay, R. K.; Phillipps, M. A. Effects of 6-Diazo-5-Oxol-Norleucine and Other Tumor Inhibitors on the Biosynthesis of Nicotinamide Adenine Dinucleotide in Mice. *Cancer Res.* 1966, 26 (2), 282-286.

(10) Hofer, A.; Steverding, D.; Chabes, A.; Brun, R.; Thelander, L. Trypanosoma Brucei CTP Synthetase: A Target for the Treatment of African Sleeping Sickness. *Proc. Natl. Acad. Sci. U.S.A.* 2001, 98 (11), 6412-6416.

(11) Grayzel, A. I.; Seegmiller, J. E.; Love, E. Suppression of Uric Acid Synthesis in the Gouty Human by the Use of 6-Diazo-5-Oxo-L-Norleucine. *J. Clin. Invest.* 1960, 39 (3), 447-454.

(12) Done, J.; Fowden, L. A New Amino Acid Amide in the Groundnut Plant (*Arachis Hypogaea*); Evidence of the Occurrence of Gamma-Methyleneglutamine and Gamma-Methyleneglutamic Acid. *Biochem. J.* 1952, 51 (4), 451-458.

(13) Wailes, P.; Whiting, M. C.; Fowden, L. Synthesis of γ-Methyleneglutamic Acid and γ-Methyleneglutamine. *Nature* 1954, 174 (4420), 130-131.

(14) Blake, J.; Fowden, L. Gamma-Methyleneglutamic Acid and Related Compounds from Plants. *Biochem. J.* 1964, 92 (1), 136-142.

(15) Zacharius, R. M.; Pollard, J. K.; Steward, F. C. 7-Methyleneglutamine and 7-Methyleneglutamic Acid in the Tulip (*Tulipa gesneriana*). 1954.

(16) Harris, G.; Tatchell, A. R. AMINO ACIDS AND PEPTIDES OF HOPS AND WORT III. THE AMINO ACIDS OF FRESH HOPS. *J. Inst. Brew.* 1953, 59 (5), 371-377.

(17) Tschiersch, B. Uber γ-Methylenglutamin Und γ-Methylenglutaminsaure in Keimlingen von Amorpha Fruticosa L. *Phytochemistry* 1962, 1 (2), 103-105.

(18) Fowden, L. The Nitrogen Metabolism of Groundnut Plants: The Role of γ-Methyleneglutamine and γ-Methyleneglutamic Acid. *Ann. Bot.* 1954, 18 (4), 417-440.

(19) Powell, G. K.; Dekker, E. E. A Modified, High Yield Procedure for the Synthesis of Unlabeled and 14C-Labeled 4-Methylene-DL-Glutamic Acid. *Prep. Biochem. Biotechnol.* 1981, 11 (3), 339-350.

(20) Ouerfelli, O.; Ishida, M.; Shinozaki, H.; Nakanishi, K.; Ohfune, Y. Efficient Synthesis of 4-Methylene-L-Glutamic Acid and Its Analogues. *Synlett* 1993, 1993 (6), 409-410.

(21) Wailes, P. C.; Whiting, M. C. Research on Acetylenic Compounds. Part LI. The Syntheses of γ-Methyleneglutamic Acid and γ-Methyleneglutamine. *J. Chem. Soc.* 1955, 3636-3641.

(22) Gershon, H.; Meek, J. S.; Dittmer, K. *ibid*. 1949, 3573.

(23) Baldwin, J. E.; Adlington, R. M.; Robinson, N. G. Nucleophilic Ring Opening of Aziridine-2-Carboxylates with Wittig Reagents; an Enantioefficient Synthesis of Unsaturated Amino Acids. *J. Chem. Soc. Chem. Commun.* 1987, No. 3, 153-155.

(24) Moody, C. M.; Young, D. W. Synthesis of Naturally Occurring 4-Alkylideneglutamic Acids. *Tetrahedron Lett.* 1993, 34 (29), 4667-4670.

(25) Eacquerra, J.; Pedregal, C.; Micó, I.; Nájera, C. Efficient Synthesis of 4-Methylene-L-Glutamic Acid and Its Cyclopropyl Analogue. *Tetrahedron: Asymmetry* 1994, 5 (5), 921-926.

(26) Riofski, M. V.; John, J. P.; Zheng, M. M.; Kirshner, J.; Colby, D. A. Exploiting the Facile Release of Trifluoroacetate for the α-Methylenation of the Sterically Hindered Carbonyl Groups on (+)-Sclareolide and (-)-Eburnamonine. *J. Org. Chem.* 2011, 76 (10), 3676-3683.

(27) Durand, X.; Hudhomme, P.; Khan, J. A.; Young, D. W. Two Independent Syntheses of (2S,4S)- and (2S,4R)-[5, 5-2H2]-5,5'-Dihydroxyleucine. *Tetrahedron Lett.* 1995, 36 (8), 1351-1354.

(28) Hossain, M. I.; Hanashima, S.; Nomura, T.; Lethu, S.; Tsuchikawa, H.; Murata, M.; Kusaka, H.; Kita, S.; Maenaka, K. Synthesis and Th1-Immunostimulatory Activity of α-Galactosylceramide Analogues Bearing a Halogen-Containing or Selenium-Containing Acyl Chain. *Bioorg. Med. Chem.* 2016, 24 (16), 3687-3695.

(29) Shukla, K.; Ferraris, D. V; Thomas, A. G.; Stathis, M.; Duvall, B.; Delahanty, G.; Alt, J.; Rais, R.; Rojas, C.; Gao, P.; Xiang, Y.; Dang, C. V; Slusher, B. S.; Tsukamoto, T. Design, Synthesis, and Pharmacological Evaluation of Bis-2-(5-Phenylacetamido-1,2,4-Thiadiazol-2-Y1)Ethyl Sulfide 3 (BPTES) Analogs as Glutaminase Inhibitors. *J. Med. Chem.* 2012, 55 (23), 10551-10563.

(30) Ioka, S.; Saitoh, T.; Iwano, S.; Suzuki, K.; Maki, S. A.; Miyawaki, A.; Imoto, M.; Nishiyama, S. Synthesis of Firefly Luciferin Analogues and Evaluation of the Luminescent Properties. *Chem.-A Eur. J.* 2016, 22 (27), 9330-9337.

(31) Chiha, S.; Soicke, A.; Barone, M.; Müller, M.; Bruns, J.; Opitz, R.; Neudörfl, J.-M.; Kühne, R.; Schmalz, H.-G. Design and Synthesis of Building Blocks for PPII-Helix Secondary-Structure Mimetics: A Stereoselective Entry to 4-Substituted 5-Vinylprolines. *European J. Org. Chem.* 2018, 2018 (4), 455-460.

The invention claimed is:

1. A compound having a structure according to Formula I:

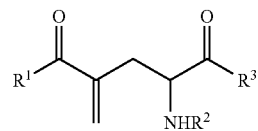

wherein $R^1$ is $NHR^4$;
$R^2$ is H or an amine protecting group;
$R^3$ is OH, or substituted or unsubstituted lower alkoxy; and
$R^4$ is an alkyl group substituted with an aryl group or a heteroaryl group, substituted or unsubstituted aryl, substituted or unsubstituted hetaryl.

2. The compound of claim 1, wherein $R^4$ is an alkyl group substituted with an aryl group.

3. The compound of claim 1, wherein $R^4$ is unsubstituted or substituted benzyl group.

4. The compound of claim 1, wherein $R^4$ is an alkyl group substituted with an aryl group, wherein the aryl group is substituted with one or more of a halogen, haloalkyl, or $NO_2$.

5. The compound of claim 4, wherein the halogen is F or Cl.

6. The compound of claim 1, wherein $R^4$ is a benzyl group or a benzyl group substituted with one or more of a halogen, haloalkyl, or $NO_2$.

7. The compound of claim 1, wherein $R^2$ is H and $R^4$ is an alkyl group substituted with an aryl group.

8. The compound of claim 7, wherein the aryl group is substituted with one or more of a halogen or $NO_2$.

9. The compound of claim 1, wherein
$R^2$ is H, or tert-butoxycarbonyl (BOC);
$R^3$ is OH, tert-butoxy or $OCH_2CH_3$; and
$R^4$ is substituted, or unsubstituted aryl, phenyl, benzyl.

10. The compound of claim 1, wherein the compound includes a structure according to Formula II:

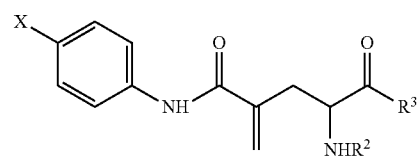

wherein X is H, halogen, haloalkyl, NO$_2$, OH, SH, CN, COOH, or CHO.

11. The compound of claim 10, wherein R$^2$ is H and X is halogen or NO$_2$.

12. The compound of claim 1, wherein the compound is a structure according to Formula III:

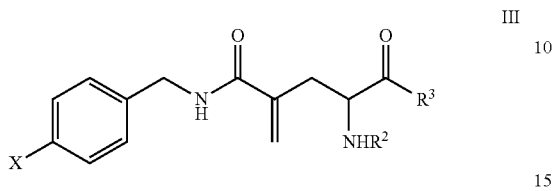

wherein X is H, haloalkyl, halogen, NO$_2$, OH, SH, CN, COOH, or CHO.

13. The compound of claim 12, wherein R$^2$ is H and X is halogen or NO$_2$.

14. A method of treating cancer, the method comprising administering one or more compounds according to claim 1 to a subject in need thereof.

15. The method of claim 14, wherein the cancer is selected from the group consisting of common cancers, rare cancers, breast cancer, triple-positive breast cancer, ER positive breast cancer, PR positive breast cancer, HER2 positive breast cancer, triple-negative breast cancer, kidney cancer, lung cancer, brain cancer, glioblastoma, head and neck cancer, or a combination thereof.

* * * * *